United States Patent
Lee et al.

(10) Patent No.: US 8,588,155 B2
(45) Date of Patent: Nov. 19, 2013

(54) METHOD OF TRANSMITTING BROADCASTING INFORMATION

(75) Inventors: Eun Jong Lee, Anyang-si (KR); Doo Hyun Sung, Anyang-si (KR); Jae Hoon Chung, Anyang-si (KR); Han Gyu Cho, Anyang-si (KR); Kyu Jin Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 634 days.

(21) Appl. No.: 12/738,823

(22) PCT Filed: Oct. 22, 2008

(86) PCT No.: PCT/KR2008/006246
§ 371 (c)(1),
(2), (4) Date: Jun. 29, 2010

(87) PCT Pub. No.: WO2009/054673
PCT Pub. Date: Apr. 30, 2009

(65) Prior Publication Data
US 2010/0272037 A1    Oct. 28, 2010

Related U.S. Application Data

(60) Provisional application No. 60/981,823, filed on Oct. 23, 2007, provisional application No. 60/988,093, filed on Nov. 14, 2007, provisional application No. 60/988,415, filed on Nov. 15, 2007.

(30) Foreign Application Priority Data

Oct. 22, 2008 (KR) .................. 10-2008-0103398

(51) Int. Cl.
*H04H 20/71* (2008.01)
*H04W 4/00* (2009.01)
*H04J 3/26* (2006.01)
*H04L 12/43* (2006.01)

(52) U.S. Cl.
USPC ............ 370/329; 370/312; 370/432; 370/459

(58) Field of Classification Search
None
See application file for complete search history.

(56) References Cited

U.S. PATENT DOCUMENTS

2003/0174674 A1    9/2003    Lee et al.
2004/0248573 A1    12/2004   Wandel
(Continued)

FOREIGN PATENT DOCUMENTS

CN    1565139 A    1/2005
CN    1839650 A    9/2006
(Continued)

*Primary Examiner* — Jutai Kao
(74) *Attorney, Agent, or Firm* — Birch, Stewart, Kolasch & Birch, LLP

(57) ABSTRACT

A method of transmitting broadcasting information or system information to user equipments in an idle mode or a sleep mode in a radio access system is disclosed. The method of transmitting broadcasting information to a user equipment in an idle mode includes receiving information related to the idle mode, decoding a control channel assigned to a first paging subframe according to the information related to the idle mode, and receiving the broadcasting information via a second paging subframe indicated by the control channel regardless of the information related to the idle mode, if the decoding of the control channel is successful.

9 Claims, 22 Drawing Sheets

(56) References Cited

U.S. PATENT DOCUMENTS

| | | |
|---|---|---|
| 2008/0207229 A1* | 8/2008 | Cave et al. .................... 455/458 |
| 2008/0287134 A1* | 11/2008 | Catovic et al. ................ 455/445 |
| 2011/0170470 A1 | 7/2011 | Sinnarajah et al. |
| 2012/0082037 A1* | 4/2012 | Wang et al. .................... 370/241 |
| 2013/0012206 A1* | 1/2013 | Kitazoe ..................... 455/435.1 |

FOREIGN PATENT DOCUMENTS

| | | |
|---|---|---|
| CN | 101032097 A | 9/2007 |
| JP | 6-77855 A | 3/1994 |
| WO | 2006/070993 A1 | 7/2006 |
| WO | 2006/071096 A1 | 7/2006 |

* cited by examiner

FIG. 4

| DL RB assignment info. | DL MIMO info. | Modulation scheme | Payload size | HARQ info. | CRC 16 bits (PI_RNTI) |

FIG. 22

| DL RB assignment info. | DL MIMO info. | Modulation scheme | Payload size | HARQ info. | P-BCH update notification | CRC 16 bits (PI_RNTI) |

METHOD OF TRANSMITTING BROADCASTING INFORMATION

This application is the National Phase of PCT/KR2008/006246 filed on Oct. 22, 2008, which claims priority under 35 U.S.C. 119(e) to U.S. Provisional Application Nos. 60/981,823 filed on Oct. 23, 2007; 60/988,093 filed on Nov. 14, 2007 and 60/988,415 filed on Nov. 15, 2007 and under 35 U.S.C. 119(a) to Patent Application No. 10-2008-0103398 filed in Republic of Korea on Oct. 22, 2008, all of which are hereby expressly incorporated by reference into the present application.

TECHNICAL FIELD

The present invention relates to a radio access system, and more particularly, to a method of transmitting broadcasting information or system information to a user equipment (UE) in an idle mode or a sleep mode in a radio access system.

BACKGROUND ART

Hereinafter, an idle mode and a sleep mode will be briefly described.

If a user equipment (UE) is turned on, the UE automatically or manually selects a public land mobile network (PLMN) to be accessed, and receives cell control information which is suitable for receiving a service in the selected PLMN. This control information may include system information and a cell broadcast message transmitted from a cell.

The UE may acquire downlink scrambling code and frame synchronization information from the control information. Although the UE is in a state in which this control information can be received from the cell, the UE may be still in the idle mode. That is, the idle mode of the UE indicates a state in which the UE does not establish radio resource control (RRC) connection with a UMTS Terrestrial Radio Access Network (UTRAN) and the location information of the UE cannot be checked in the network.

Accordingly, the UE in the idle mode can be distinguished using an international mobile subscribe identity (IMSI), a temporary mobile subscribe identity (TMSI) or a packet-TMSI (P-TMSI) which is the identity of the UE used on a network access system (NAS). If the UE transmits an RRC connection request message to the UTRAN and activates the RRC connection, the UE transitions to a connection mode.

FIG. 1 is a view showing an example of a paging subframe structure and a paging discontinuous reception (DRX) cycle of a UE in an idle mode.

FIG. 1 shows the paging DRX cycle which can be used by the UE in the idle mode or the sleep mode. The idle mode or the sleep mode of the UE indicates a state in which the UE does not exchange data with a system. In this case, the UE can check whether or not there is a call directed to the UE using the paging DRX cycle.

Generally, one paging DRX cycle may be configured by n paging occasions and each of the paging occasions may be configured by m subframes. One of the subframes in the paging occasion may be used as a paging subframe, and UEs which select the same paging occasion may awake once on at the same subframe in the paging DRX cycle (or the paging occasion) so as to check whether or not there is a call directed to the UE by a paging indicator-radio network temporary identifier (PI-RNTI).

FIG. 1 schematically shows the structure of the paging subframe. The subframe which is selected as the paging subframe may be configured by a paging indicator channel (PICH) and a paging channel (PCH) for transmitting a paging message. The PICH indicates the location of the PCH, via which the actual paging message is transmitted, as a control channel for paging. In the drawings showing the embodiments of the present invention, the PICH is represented by a PI.

Generally, even when broadcasting information is transmitted to the UE in the idle mode or the sleep mode, the PICH and the PCH may be used. The paging subframe structure of FIG. 1 is an example of broadcasting information transmission, which shows the subframe structure in the case where at least one UE is paged within all paging occasions and a paging message and broadcasting information are transmitted together.

FIG. 2 is a view showing an example of a process of changing and updating system information.

FIG. 2 shows a method of changing system information (system units (SUs)) transmitted via a dynamic broadcast channel (DBCH; e.g., a downlink shared channel (DL-SCH)).

If the system information is changed in an $(N+1)^{th}$ broadcast control channel (BCCH) modification period, a base station (BS) notifies the UE of information indicating that the system information is changed in a next modification period, in an $n^{th}$ BCCH modification period. A modification period boundary is defined by SFN mod N (N may be set by the system information).

FIG. 3 is a view showing an example of a method of transmitting a notification message for the change of the system information to UEs in an idle mode or a sleep mode.

DBCH update notification information is transmitted via the PCH, via which the paging message is transmitted, such that all UEs can newly receive system information (e.g., SU-n) updated in a next BCCH modification period.

Each of the UEs in the idle mode or the sleep mode performs the following procedure. First, each of the UEs receives a master information block (MIB) via a primary broadcast channel (PBCH) and receives a system unit including system information via a DBCH.

Each of the UEs may select a paging occasion of each UE using a parameter received via the system information. The UE may check whether or not a PICH has transmitted using a PI-RNTI in a paging occasion of a paging DRX cycle.

If the system information transmitted via the DBCH is changed, the BS may transmit the changed system information to the UEs via the PCH. In FIG. 3, if all UEs recognize that the DBCH information is changed in an $n^{th}$ BCCH modification period, the BS transmits the changed system information of the DBCH to the UEs in an $(n+1)^{th}$ BCCH modification period, and the UEs receive the changed system information. Each UE transitions to an active state if there is a paging message directed to the UE and repeatedly performs a paging occasion if there is no paging message directed to the UE.

In FIG. 3, the system information (SI) includes a variety of information such as mobility support and measurement information of the UE in an active state (RRC_connected state) and system information necessary for connecting the UE in the sleep mode or the idle mode (RRC_IDLE state) to the network.

The SI may be generated from a core-network or a BS and managed in an RRC layer. In order to systematically transmit the SI, a system information block (SIB) is configured by combining plural pieces of SI having similar characteristics in the RRC layer. The SI belonging to different SIBs has different characteristics in a transmission repeat cycle as well as contents. Among them, several SIBs are defined by a mater information block (MIB), and the MIB includes reference information or scheduling information of SIBs broadcasted in a cell. The MIB is regularly transmitted via a BCH (mapping to the PBCH of a physical channel), and the UE can readily receive the MIB.

If a UE receives information transmitted by the MIB, the UE no longer requests the update of the information. The SI transmitted by the BS via the PBCH in FIG. 3 is as follows. The SI may include a physical layer parameter, a system frame number, scheduling information of the most frequently repeated scheduling unit (SU-1), and a value tag.

At this time, the physical layer parameter may include a downlink system bandwidth, the number of transmit antennas, and a reference-signal transmit power level.

The BS may transmit an RRC message called a system unit (SU) obtained by combining the SIBs having similar characteristics except SIBs belonging to the MIB. At this time, SU-1 is transmitted in a smallest period (80 ms) and the other SU-n is transmitted in a period which is scheduled in the SU-1.

The BS transmits the SUs to UEs via the DBCH and each of the SUs is configured by a parameter which can be changed. If the system information is changed, all the UEs request the update of the SI. Accordingly, the methods shown in FIGS. 2 and 3 are used for the update of the SI which is generally changed.

FIG. 4 is a view showing an example of a PICH structure which is generally used.

The fields of the PICH which is a control channel of a first layer L1 and a second layer L2 may use the format of a PDCCH used in a downlink (DL) scheduling grant. Such a PICH may be XOR-operated with a CRC using a PI-RNTI instead of a C-RNTI in order to distinguish the PICH from the DL scheduling grant. The UE in the idle mode or the sleep mode blind-decodes the CRC by the PI-RNTI, recognizes that there is a paging message transmitted within a paging occasion, to which the UE belongs, and decodes the PCH.

The fields of the PICH may include DL resource (RB) assignment information, DL MIMO information, a modulation scheme, a payload size, HARQ information and a CRC which is XOR-operated by the PI-RNTI, as shown in FIG. 4.

FIGS. 5 and 6 are views showing one of methods of transmitting broadcasting information to the UEs in the idle mode or the sleep mode.

In order to transmit broadcasting information (e.g., system information change or update) to UEs in the idle mode or the sleep mode, the BS may use a paging DRX cycle. The paging procedure between the UEs and the BS is as follows.

Each of the UEs in the idle mode or the sleep mode may select one paging occasion within a paging DRX cycle by a subframe level. Each of the UEs in the idle mode awakes in a paging subframe corresponding thereto using one paging occasion and checks whether or not paging information has transmitted to each UE.

Referring to FIGS. 5 and 6, a first UE (UE1) selects a first paging occasion within the paging DRX cycle, awakes in a corresponding subframe, and blind-decodes a PDCCH by a PI-RNTI. If each of the UEs successfully performs blind decoding, each of the UEs determines that a paging message is present in the paging occasion selected by each UE and stores and decodes the paging message included in the PDSCH using the RB assignment information and the payload size of the PDCCH.

Each of the UEs can check that the paging message is transmitted to each UE, after decoding the PDSCH. If the paging message is checked, each of the UEs performs a random connection procedure and transitions to an active state. However, if the paging message is not transmitted to each UE, each UE transitions to a sleep mode again, awakes in a corresponding subframe again after the DRX cycle, and repeatedly performs the paging procedure.

Generally, the UEs which select the same paging occasion implicationally belong to the same group and the UEs belonging to the same group may be paged via one PDSCH. That is, if any one of the UEs belonging to the same paging group is paged, all the UEs belonging to the same paging group should decode a PDCCH and a PDSCH. Any one of the UEs within a cell have at least one group (e.g., within a paging occasion), implicitly.

Generally, if broadcasting information should be transmitted to all the UEs in the idle mode within a specific cell, the BS may use the paging procedure. For example, if the BS has broadcasting information which will be transmitted to all the UEs within the cell, the BS may transmit a paging message and the broadcasting information to the UEs via the PDSCH using a PI-RNTI in all paging occasions.

Unlike the paging message for transmitting different contents to the UEs belonging to each paging occasion (e.g., the UEs belonging to the same paging group), the broadcasting information transmits the same contents to all the UEs. The broadcasting information should be transmitted in all paging occasions regardless of whether or not the paging message has transmitted.

In FIG. 5, it is assumed that the broadcasting information is transmitted to the UE if the paging message is present in all the paging occasions and, in FIG. 6, it is assumed that the paging message is not present in all the paging occasions. As shown in FIGS. 5 and 6, the BS repeatedly transmits the same broadcasting information within all the paging occasions regardless of whether or not the paging message has transmitted. The broadcasting information is repeatedly transmitted within all the paging message periods regardless of whether or not the paging message has transmitted, and each of the UEs awakes in a predetermined paging subframe and decodes both the PDCCH and the PDSCH in order to receive the broadcasting information.

Generally, the BS transmits the broadcasting information to all the UEs using the PCH. That is, the broadcasting information is repeatedly transmitted by the number (n) of paging occasions in a paging message transmission period as shown in FIGS. 5 and 6.

Accordingly, since the BS repeatedly transmits the same broadcasting information to the UEs n times, overhead of a radio resource may be increased.

The generally used technology uses the same format as the PDCCH used when the DL scheduling grant is transmitted to the UEs in the active state via the PICH which is the control channel for paging.

Accordingly, the PICH may include information unnecessary for the transmission of the multicast and/or broadcasting information such as MIMO information, an MCS level and HARQ information as well as necessary information such as DL radio resource assignment information and the payload size. That is, since the BS continuously transmits unnecessary information via the PICH, a significant amount of radio resources may be wasted.

In the generally used technology, in order to allow the UE to receive the SI via the DBCH, the configuration of the physical HARQ indication channel (PHICH) is preferentially requested. Accordingly, it is preferable that the PHICH configuration information is transmitted via the MIB.

In the general technology, if the UE receives information transmitted via the PBCH once, the update is no longer requested. The PHICH configuration information may be changed. If the PHICH configuration information is changed, all the UEs can request the update of the information transmitted via the PBCH.

However, in the general technology, a method of updating the SI transmitted via the DBCH is defined, but a method of changing information about the PBCH is not defined. Accordingly, since the PHICH configuration information is transmitted to the UE via the PBCH, the method of updating the SI via the PBCH is necessary.

DISCLOSURE

Technical Problem

An object of the present invention devised to solve the problem lies on a method of efficiently transmitting data.

Another object of the present invention devised to solve the problem lies on a method of efficiently transmitting broadcasting information or system information to user equipments (UEs) in an idle mode or a sleep mode.

Another object of the present invention devised to solve the problem lies on a method of properly using information which is unnecessarily used in a physical downlink control channel and a method of configuring a new control channel for transmitting broadcasting information in order to reduce the overhead of the whole radio resource.

Another object of the present invention devised to solve the problem lies on a method of updating system information (SI) transmitted via a primary broadcast channel (PBCH).

Another object of the present invention devised to solve the problem lies on a method of efficiently transmitting updated SI to UEs in an idle mode or a sleep mode.

Technical Solution

In order to solve the above-described problems, the present invention relates to a method of transmitting broadcasting information or system information to user equipments in an idle mode or a sleep mode in a radio access system.

The object of the present invention can be achieved by providing a method of transmitting broadcasting information to a user equipment (UE) in an idle mode, the method including: receiving information related to the idle mode; decoding a control channel assigned to a first paging subframe according to the information related to the idle mode; and receiving the broadcasting information via a second paging subframe indicated by the control channel regardless of the information related to the idle mode, if the decoding of the control channel is successful.

The control channel may be a paging indication channel (PICH), and the PICH may be masked using a paging indicator-radio network temporary identity (PI-RNTI).

The control channel may include a broadcasting information indicator (BI) field indicating whether or not the broadcasting information is present in a specific subframe and a broadcasting information occasion offset (BIO) field indicating the transmission location of the broadcasting information. At this time, the information related to the idle mode may include a paging discontinuous reception (DRX) cycle field indicating a time interval for monitoring a paging occasion of the UE and a paging occasion field indicating a paging occasion monitored in order to allow the UE to receive a paging message. In addition, the BIO field may be assigned in the unit of paging occasions.

In the decoding of the control channel, if the BI field indicates that the broadcasting information has not transmitted in a current paging occasion, the UE immediately may enter the idle mode again without decoding a downlink shared channel of the paging subframe. At this time, the broadcasting information may be system information, the BI field may indicate whether or not the system information has updated, and the BIO field may indicate the transmission location of a system information update message.

The method may further include receiving the system information update message via a specific subframe indicated by the BIO field. At this time, the broadcasting information may be system information, the BI field may indicate whether or not the system information has updated, and the BIO field may indicate a time point when the updated system information is applied. In addition, the BIO field may indicate that the broadcasting information is periodically transmitted within the paging DRX cycle.

In another aspect of the present invention, provided herein is a method of efficiently transmitting broadcasting information to a user equipment (UE) in an idle mode, the method including: receiving information related to the idle mode, the information related to the idle mode including a discontinuous reception (DRX) cycle and a paging occasion; decoding a physical downlink control channel assigned to a first paging subframe according to the information related to the idle mode; decoding a physical downlink shared channel indicated by the control channel in the first paging subframe; and receiving the broadcasting information via a second paging subframe indicated by the physical downlink shared channel regardless of the information related to the idle mode.

The control channel may include a broadcasting information indicator (BI) field indicating whether or not the broadcasting information is present in a specific subframe and a broadcasting information occasion offset (BIO) field indicating the transmission location of the broadcasting information.

At this time, the broadcasting information may be system information, the control channel may indicate the location of the downlink shared channel, to which a broadcasting information indicator (BI) field indicating whether or not the system information has updated in the first paging subframe and a broadcasting information occasion offset (BIO) field indicating the transmission location of a system information update message are assigned.

The broadcasting information may be system information, the BI field may indicate whether or not the system information has updated, and the BIO field may indicate a time point when the updated system information is applied.

In another aspect of the present invention, provided herein is a method of transmitting broadcasting information to a user equipment (UE), the method including: transmitting information related to the idle mode; transmitting a control channel to the UE via a first paging subframe according to the information related to the idle mode; and broadcasting the broadcasting information via a second paging subframe indicated by the control channel regardless of the information related to the idle mode.

In another aspect of the present invention, provided herein is a method of transmitting broadcasting information to a user equipment in an idle mode, the method including: receiving a paging indicator channel (PICH) in a first paging occasion of a paging discontinuous reception (DRX) cycle; and decoding a physical downlink shared channel indicated by the PICH, wherein the PICH includes a field notifying whether or not the broadcasting information transmitted via primary broadcast channel (PBCH) has updated.

The broadcasting information may be system information, and the system information may include at least one of a physical layer parameter, a system frame number, scheduling information and value tag information.

In another aspect of the present invention, provided herein is a method of transmitting broadcasting information to a user equipment in an idle mode, the method including: receiving a paging indicator channel (PICH) in a first paging occasion of a paging discontinuous reception (DRX) cycle; and decoding a physical downlink shared channel (PDCH) indicated by the PICH, wherein the PDSCH includes a paging channel notifying whether or not the broadcasting information transmitted via a primary broadcast channel (PBCH) has updated.

The broadcasting information may be system information, and the system information may include at least one of a physical layer parameter, a system frame number, scheduling information and value tag information.

ADVANTAGEOUS EFFECTS

The embodiments of the present invention have the following effects.

First, it is possible to efficiently transmit data.

Second, it is possible to efficiently transmit broadcasting information or system information to user equipments in an idle mode or a sleep mode.

Third, it is possible to efficiently transmit broadcasting information or system information to user equipments in an idle mode or a sleep mode without wasting a radio resource, if the broadcasting information or the system information is updated.

Fourth, a base station can efficiently use a radio resource which is unnecessarily wasted in a physical downlink control channel. Accordingly, when the base station transmits the broadcasting information or the system information, it is possible to reduce the overhead of the radio resource. For example, in view of the base station, it is possible to reduce the waste of the radio resource by a maximum of 1/n (n is the number of paging occasions).

Fifth, it is possible to efficiently operate a system by notifying the user equipments whether or not the system information (e.g., MIB information) transmitted via a primary broadcast channel (PBCH) has updated using a paging indicator channel and a paging channel.

DESCRIPTION OF DRAWINGS

The accompanying drawings, which are included to provide a further understanding of the invention, illustrate embodiments of the invention and together with the description serve to explain the principle of the invention.

In the drawings:

FIG. 4 is a view showing an example of a PICH structure which is generally used.

FIG. 22 is a view showing another example of a PICH format which may be used in the embodiments of the present invention.

MODE FOR INVENTION

Figure 1:
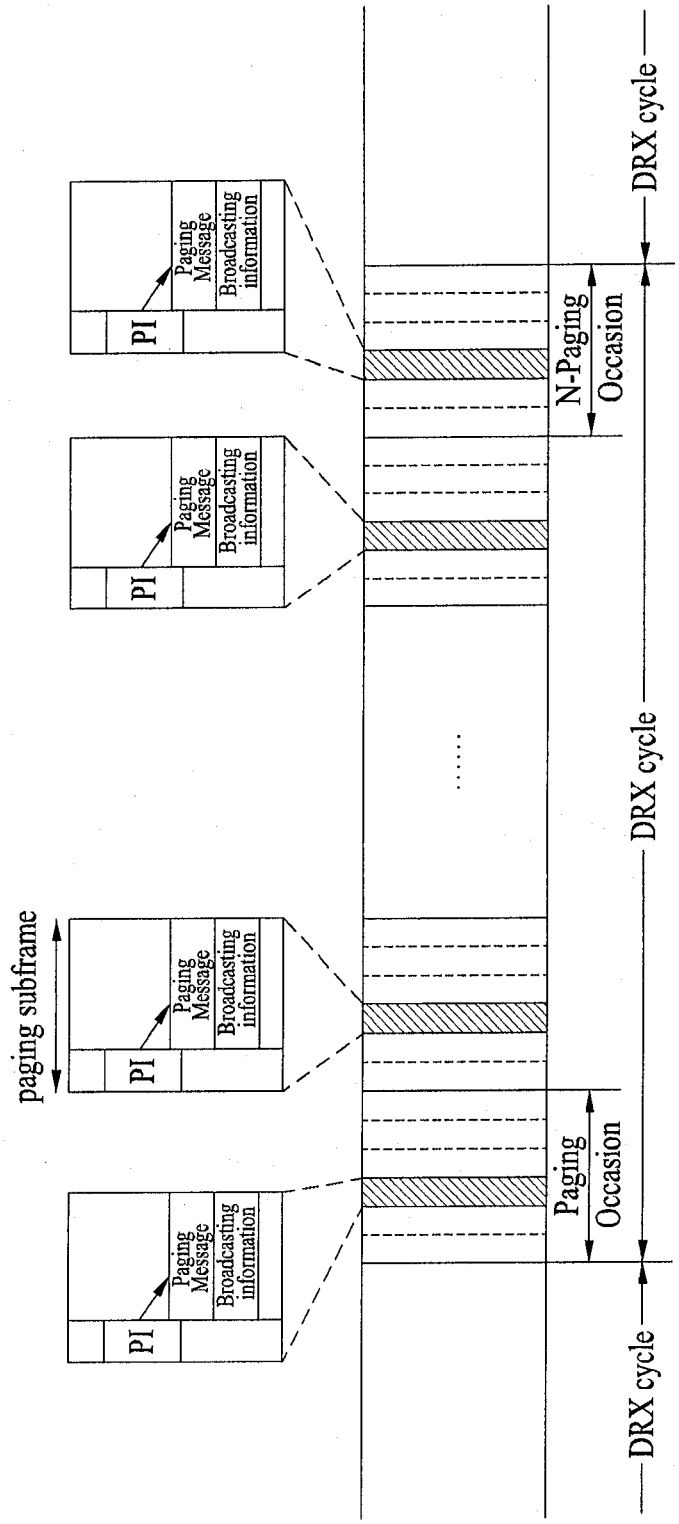
FIG. 1 is a view showing an example of a paging subframe structure and a paging DRX cycle of a user equipment (UE) in an idle mode.
Figure 2:
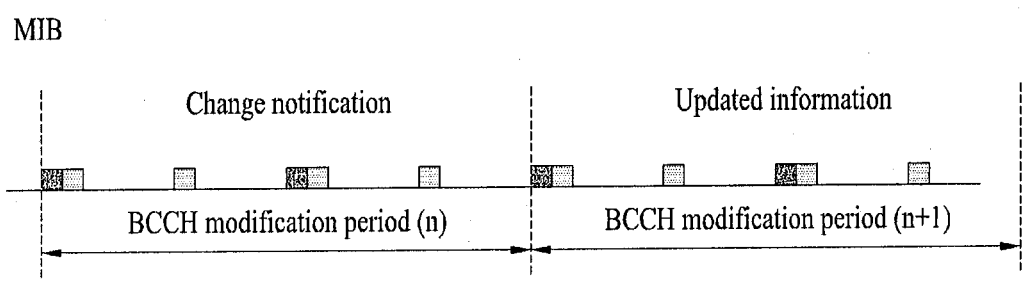
FIG. 2 is a view showing an example of a process of changing and updating system information (SI).
Figure 3:
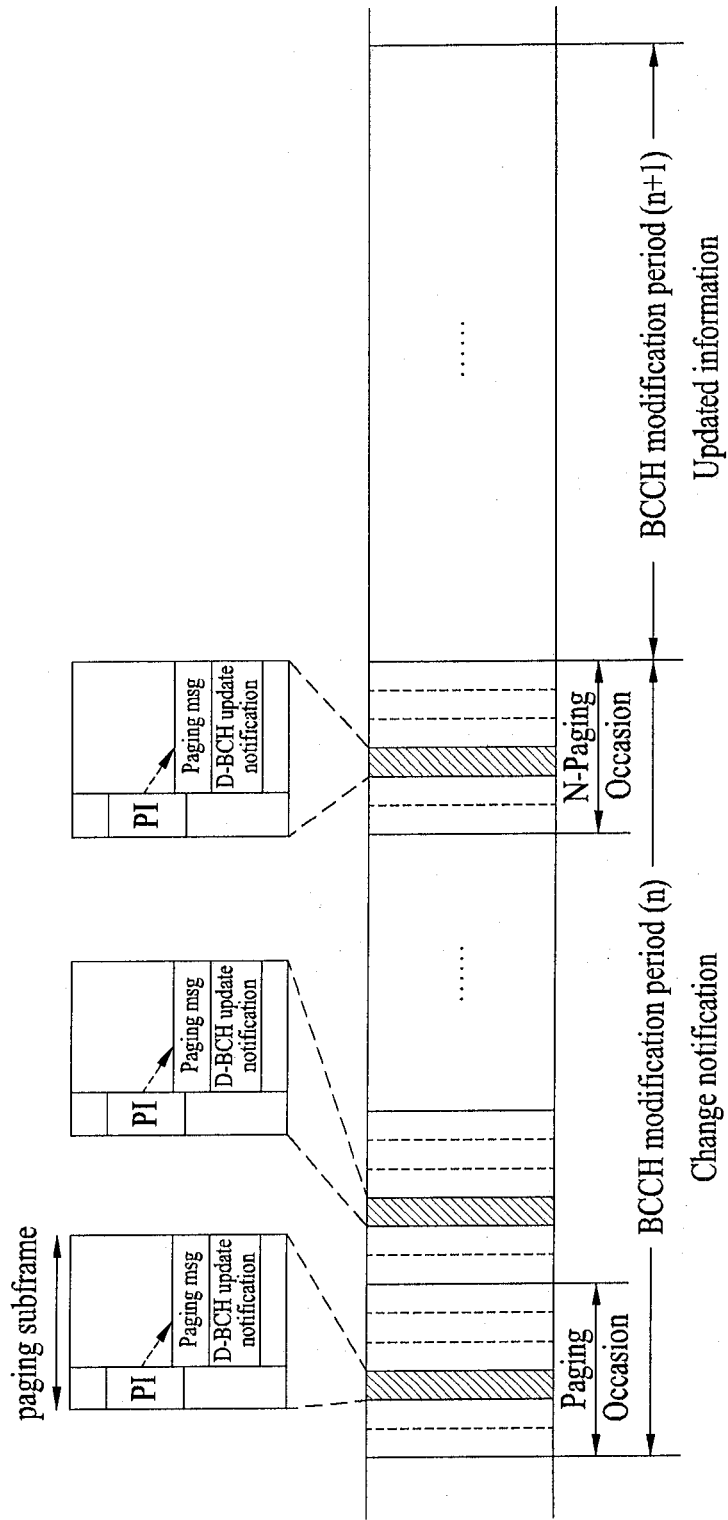
FIG. 3 is a view showing an example of a method of transmitting a notification message for SI change to a UE in an idle mode or a sleep mode.

The present invention relates to a radio access system. The present invention relates to a method of transmitting broadcasting information or system information (SI) to user equipments (UEs) in an idle mode or a sleep mode in a radio access system.

The following embodiments are realized by combinations of components and features of the present invention in a predetermined form. It may be considered that the components or the features are optional unless specially noted. The components or the features may be implemented without being combined with other components or features. The embodiments of the present invention may be realized by combinations of portions of the components and/or features. The sequence of the operations described in the embodiments of the present invention may be changed. Portions of the components and features of any embodiment may be included in other embodiments or may be replaced with the components or features corresponding to the other embodiments.

In the description of the drawings, a procedure or step which renders the scope of the present invention unnecessarily ambiguous is not described and a procedure or a step which can be understood by those skilled in the art is not described.

In the present specification, the embodiments of the present invention will be described concentrating on a relationship between transmission and reception of data before a base station (BS) and a UE. The BS indicates a terminal node of a network for directly performing communication with the UE. In the present specification, a specific operation which is performed by the BS may be performed by an upper node of the BS, if necessary.

That is, various operations which are performed for communication with the UE in a network configured by a plurality of network nodes including the BS may be performed by the BS or other network nodes except the BS. At this time, the "BS" may be replaced with a fixed station, a Node-B, an eNode-B (eNB) or an access point. The "UE" may be replaced with a mobile station (MS), a subscriber station (SS), a mobile subscriber station (MSS) or a mobile terminal.

A transmitter indicates a node for transmitting a data or voice service and a receiver indicates a node for receiving a data or voice service. Accordingly, the UE may function as the transmitter and the BS may function as the receiver in uplink. Similarly, the UE may function as the receiver and the BS may function as the transmitter in downlink.

As the mobile terminal of the present invention, a personal digital assistant (PDA), a personal communication service (PCS) phone, a global system for mobile (GSM) phone, a wideband CDMA (WCDMA) phone, or a mobile broadband system (MBS) phone may be used.

The embodiments of the present invention may be implemented by various units. For example, the embodiment of the present invention may be implemented by hardware, firmware, software or a combination thereof.

In the implementation using hardware, methods according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, micro controllers or microprocessors.

In the implementation using firmware or software, the methods according to the embodiments of the present invention may be implemented in the form of modules, procedures or functions for performing the above-described functions or operations. A software code may be stored in a memory unit and operated by a processor. The memory unit may be located inside or outside the processor so as to exchange data with the processor by various known units.

The embodiments of the present invention are supported by standard documents disclosed in at least one of the Institute of Electrical and Electronic Engineers 802 (IEEE802) system, the $3^{rd}$ generation partnership project (3GPP) system, the 3GPP LTE system and the 3GPP2 system, all of which are radio access systems. That is, the steps or the portions of the embodiments of the present invention which are not described in order to clarify the technical spirit are supported by the above-described documents. All the terms disclosed in the present specification may be described by the above-described standard documents. In particular, the embodiments of the present invention are supported by the standard documents such as the 3GPP TS 36.211, TS 36.212, TS 36.213 and/or 3GPP TS 36.331, all of which are the standard documents of the 3GPP LTE system.

The specific terms used in the following description are provided in order to facilitate the understanding of the present invention and may be changed in other forms without departing from the technical scope of the present invention.

Figure 7:
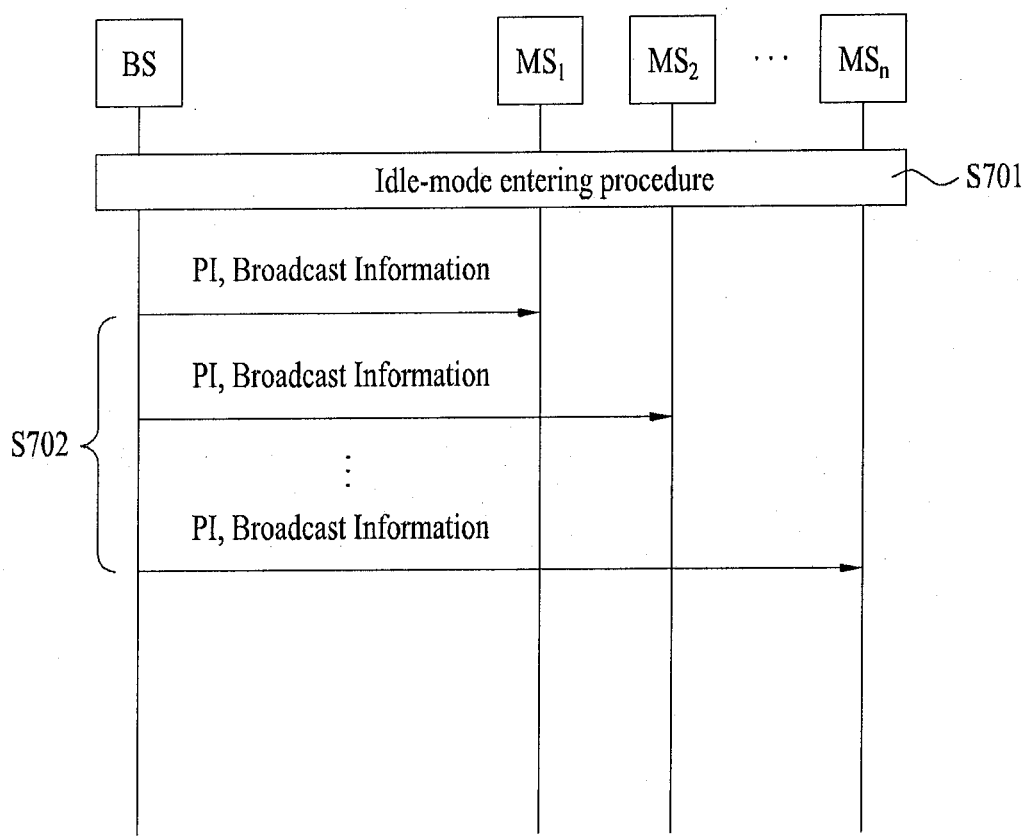
FIG. 7 is a view showing a method of transmitting broadcast information to a mobile station (MS) in an idle mode or a sleep mode according to an embodiment of the present invention.

FIG. 7 is a view showing a method of transmitting broadcast information to an MS in an idle mode or a sleep mode according to an embodiment of the present invention.

Referring to FIG. 7, at least one MS and a BS may perform an idle-mode or sleep-mode entering procedure in order to enter an idle mode or a sleep mode. At this time, the MS may select one paging occasion within a paging DRX cycle in the unit of subframes (S701).

After the BS and the MS enter the idle mode, the BS may transmit paging indicator channel (PICH) and broadcast information to the MSs in the paging occasions which are negotiated in the step S701 (S702).

Figure 8:
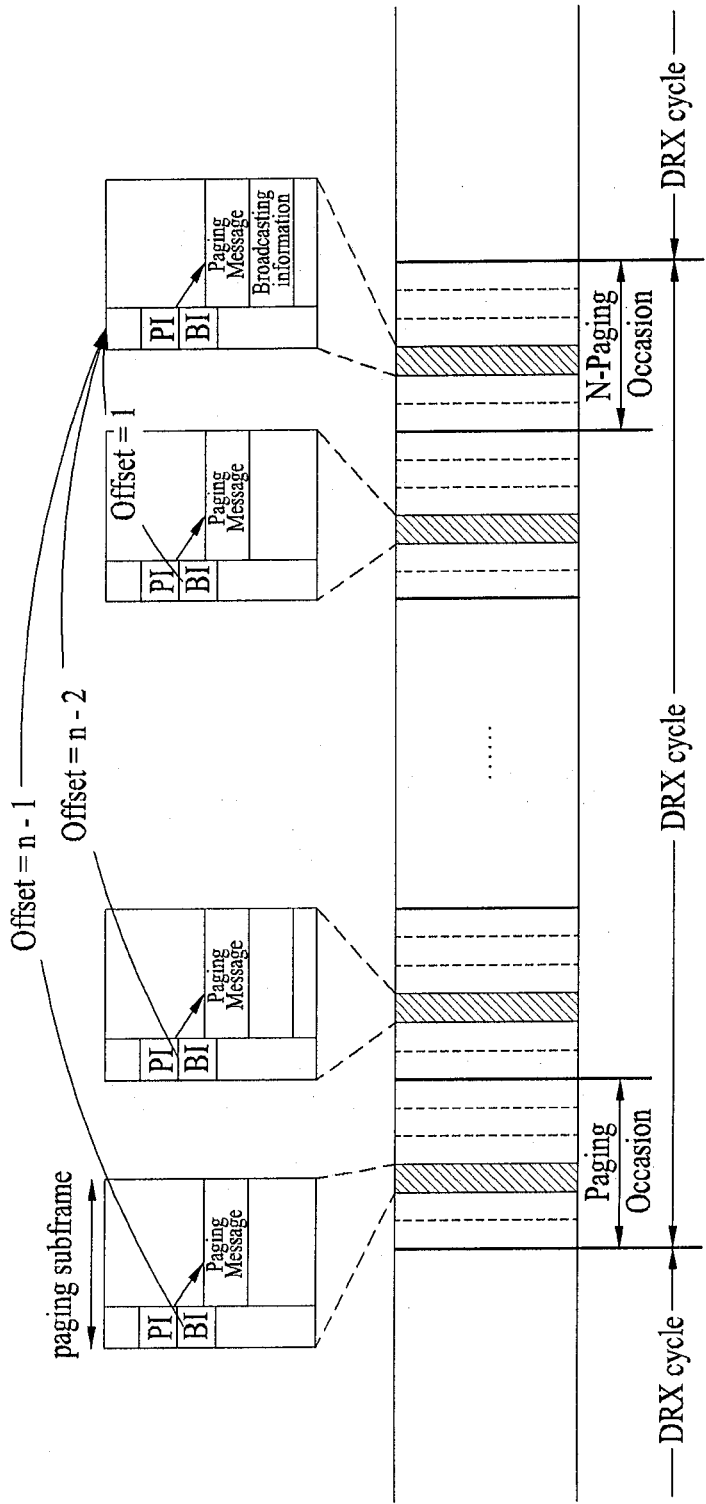
FIG. 8 is a view showing an example of a paging subframe structure of a UE in an idle mode or a sleep mode according to an embodiment of the present invention.

FIG. 8 is a view showing an example of a paging subframe structure of a UE in an idle mode or a sleep mode according to an embodiment of the present invention.

FIG. 8 shows the structure of the subframe for transmitting broadcasting information of the present invention. That is, FIG. 8 shows a method of efficiently transmitting broadcasting information using a paging DRX cycle which is generally used.

While the BS repeatedly transmits the broadcasting information to UEs in all paging occasions in FIG. 1, the BS transmits the broadcasting information, which will be transmitted to UEs in the idle mode or the sleep mode, all the UEs once in a specific paging subframe in FIG. 8.

For example, the BS may transmit the broadcasting information in a paging subframe of a paging occasion separated from a first paging occasion, in which the transmission of the broadcasting information is requested, by a DRX cycle length (e.g., n paging occasions) once (or at least two within a DRX cycle). At this time, in the embodiments of the present invention, the format structure of the PICH which was conventionally used needs to be changed in order to perform the operation shown in FIG. 8.

Figure 9:
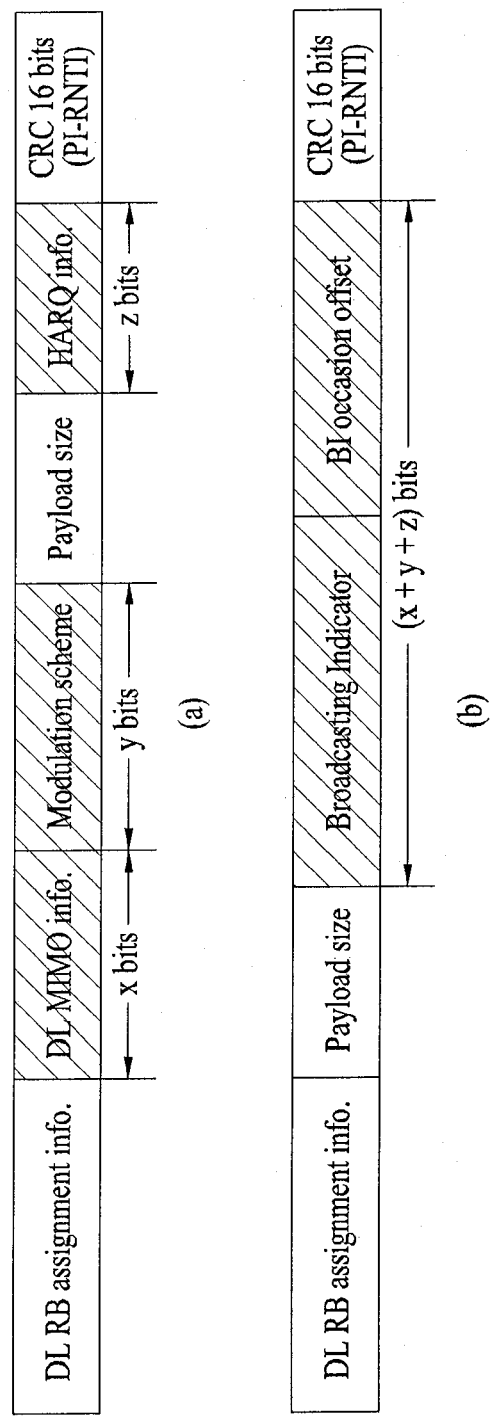
FIG. 9 is a view showing an example of a PICH format which may be used in the embodiments of the present invention.

FIG. 9 is a view showing an example of a PICH format which may be used in the embodiments of the present invention.

FIG. 9(a) shows the PICH format which is generally used. In FIG. 9(a), the PICH may include a downlink (DL) resource block (RB) assignment information field, a DL MIMO information field, a modulation scheme field indicating a modulation scheme, a payload size field indicating the size of a payload to which actual data is assigned, a HARQ information field for reliable transmission of data, and a CRC field for error correction of the PICH.

The DL MIMO information field (x bits), the modulation scheme field (y bits) and the HARQ information field (z bits) of the PICH are unnecessary for transmitting the broadcasting information or system information (SI) to the UEs in the idle mode or the sleep mode. Accordingly, the unnecessary fields need to be reused.

FIG. 9(b) shows a new format of the PICH which may be used in the embodiments of the present invention. For example, the PICH may include a broadcasting information indicator (BI) field (k bits) indicating whether or not broadcasting information and a paging message is present in a physical downlink shared channel (PDSCH) of the same subframe or indicating whether or not the broadcasting information has checked in the paging occasion of other subframes, and a BI occasion offset (BIO) field (j bits) indicating how many the paging occasion for transmitting actual broadcasting information is separated from the current paging occasion of the UE.

That is, in FIG. 9(b), x, y and z bits used in FIG. 9(a) may be used for the BI field (k bits) and the BIO field (j bits). The size of (k+j) bits may be equal to or smaller than (x+y+z) bits.

Referring to FIG. 8 again, the BS may transmit PICH to the UEs and notify the UEs whether or not the paging message has transmitted. In addition, the BS may transmit the PICH including the BI and BIO fields, such that the UEs can notify whether the broadcasting information exist or not and where the transmission location of the broadcasting information.

Figure 10:
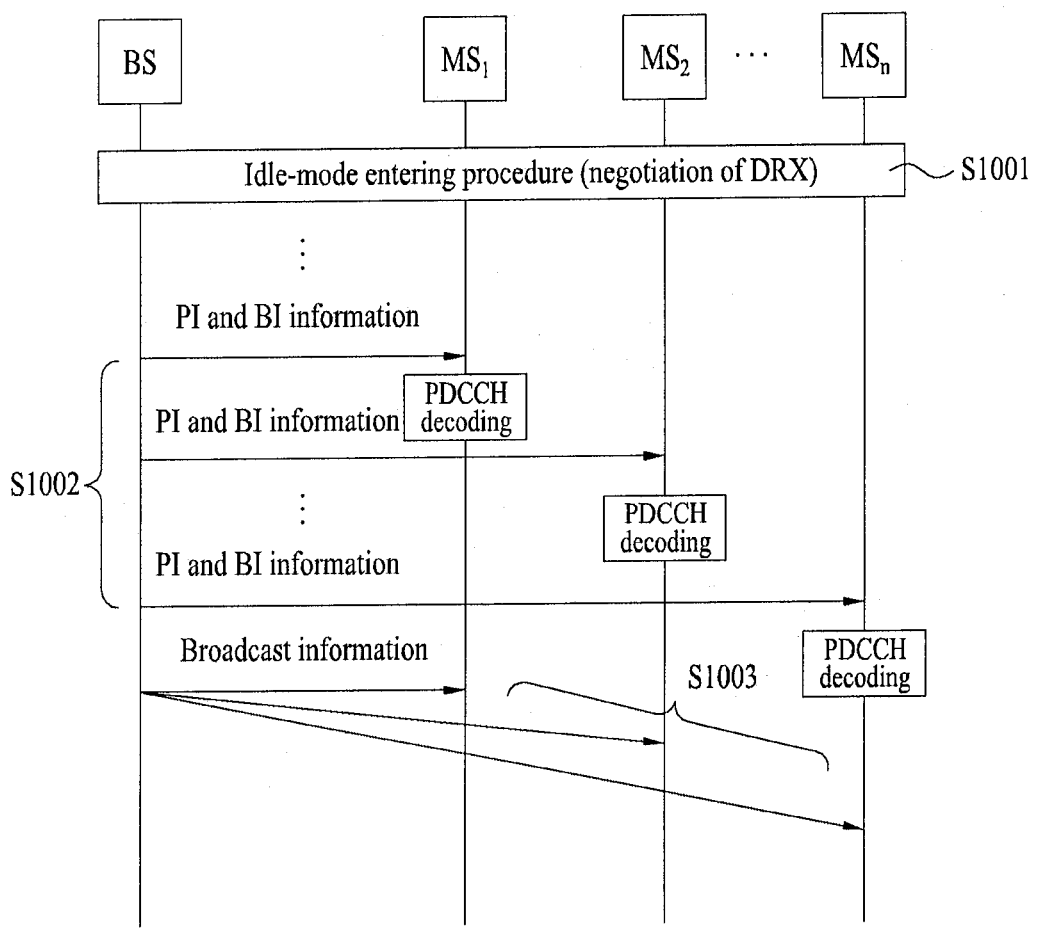
FIG. 10 is a view showing one of methods of, at a base station (BS), transmitting broadcast information to MSs according to an embodiment of the present invention.

FIG. 10 is a view showing one of methods of, at a BS, transmitting broadcast information to MSs according to an embodiment of the present invention.

A BS and at least one mobile station (MS1, MS2, ..., and MSn) may perform an initial negotiation procedure for entering an idle mode or a sleep mode (S1001).

The BS may transmit a PICH to the MSs in a paging DRX cycle negotiating with at least one MS and notify the MSs of a paging indicator (PI) and BI information (BI and/or BIO) (S1002).

In the step S1002, the MSs decode a physical downlink control channel (PDCCH) in the paging DRX cycle negotiating with the BS so as to check the PICH. At this time, the PICH described with reference to FIG. 9(b) may be used as the PICH.

The BS may broadcast the broadcast information to the MSs once in a paging subframe indicated by the BI information transmitted to the MSs in the step S1002. In addition, if each MS in the idle mode or the sleep mode checks the BI information, it is checked whether or not the broadcast information directed to each MS is present. If the broadcast information directed to each MS is present, each MS may receive the broadcast information in the paging subframe indicated by the BIO field (S1003).

Figure 11:
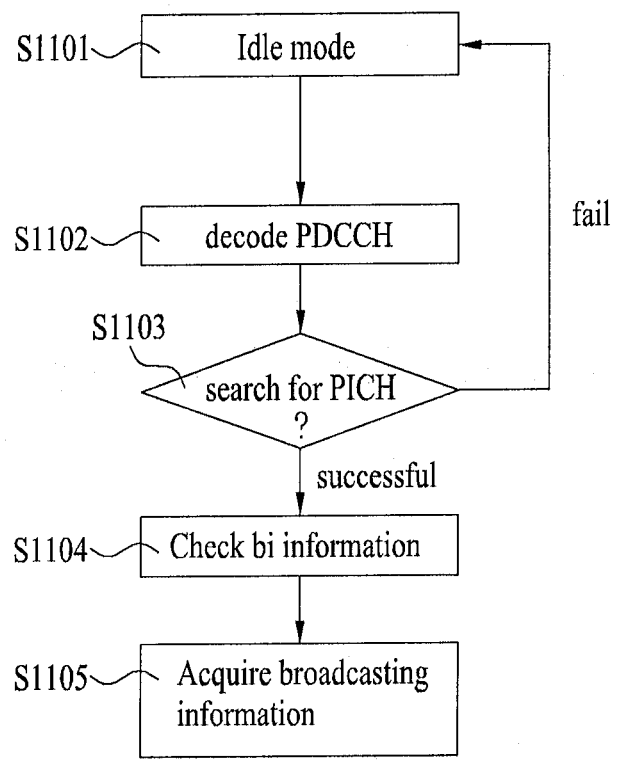
FIG. 11 is a flowchart illustrating a method of, at an MS in an idle mode or a sleep mode, receiving broadcasting information according to an embodiment of the present invention.

FIG. 11 is a flowchart illustrating a method of, at an MS in an idle mode or a sleep mode, receiving broadcast information according to an embodiment of the present invention.

Referring to FIG. 11, the MS may perform negotiation with a BS in order to enter the idle mode or the sleep mode (S1101).

The MS in the idle mode or the sleep mode may awake in a paging subframe of a first paging cycle selected by the MS and decode a PDCCH (S1102).

The MS may check BI information (BI and/or BIO) (S1104) if the PDCCH is decoded and a PICH is successfully searched for using a PI-RNTI (S1103).

The MS may awake in a specific paging subframe indicated by the BIO field regardless of a DRX cycle selected by the MS, decode the PDCCH and PDSCH, and acquire broadcast information (S1105).

If the acquisition of the PICH by the MS fails in the step S1103, the MS may determine that the paging message or the broadcast signal transmitted to the MS is not present, enter the idle mode or the sleep mode again, and wait for the reception of a next paging message.

Figure 12:
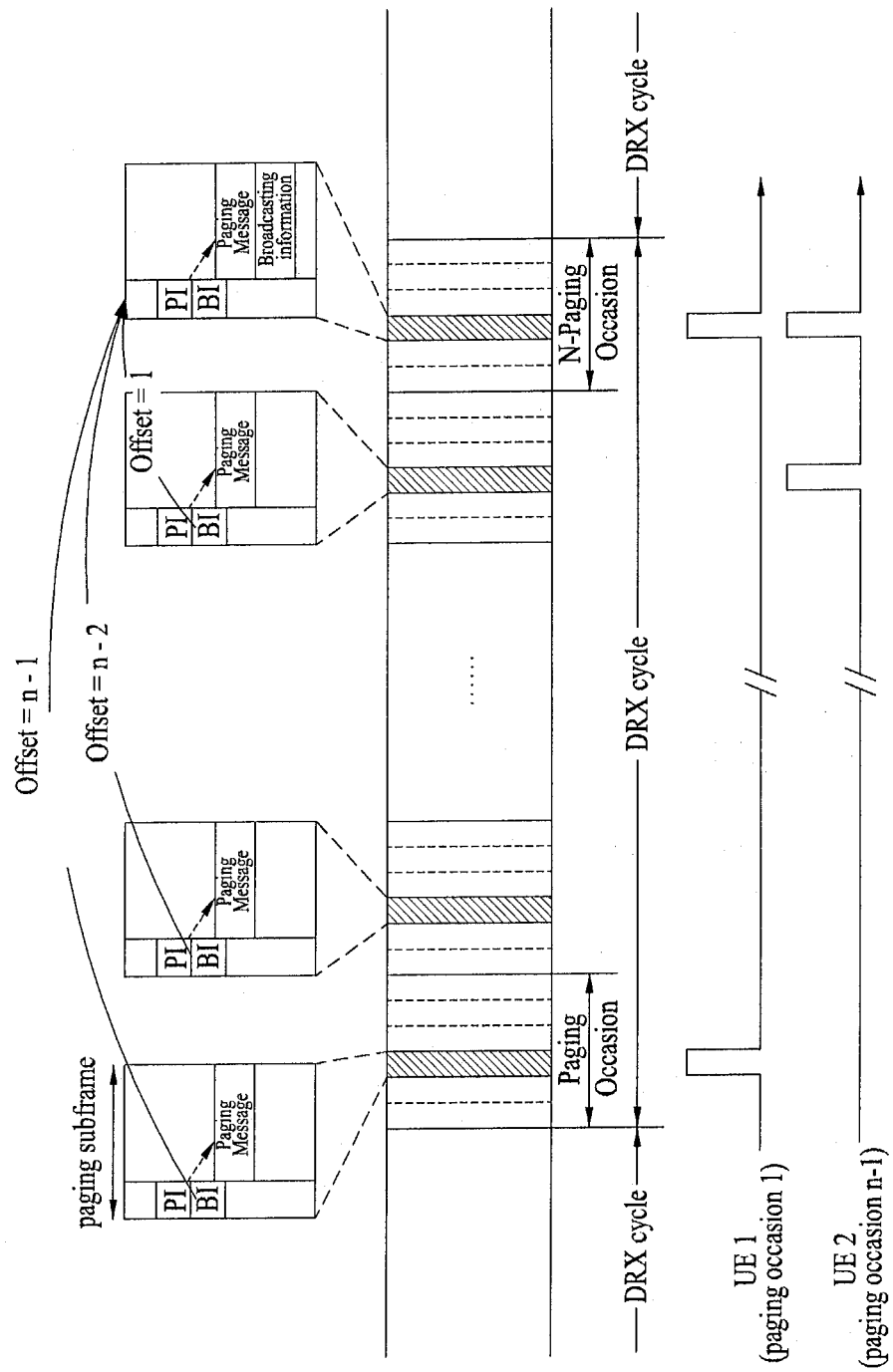
FIG. 12 is a view showing the paging subframe structure shown in FIG. 8 and a paging DRX cycle pattern, according to the embodiment of the present invention.

FIG. 12 is a view showing the paging subframe structure shown in FIG. 8 and a paging DRX cycle pattern, according to the embodiment of the present invention.

In FIG. 12, it is assumed that a first UE (UE1) selects a first paging occasion as a paging period and a second UE (UE2) selects an $(n-1)^{th}$ paging occasion as a paging period.

The first UE (UE1) may awake in the first paging occasion, blind-decode a PDCCH, and decode a PICH using a PI-RNTI. The UE may check when a paging message for the first UE is transmitted and a BI field, via which the broadcasting information is transmitted, from the PICH. Accordingly, the UE may receive the paging message in the PDSCH indicated by a PI field and acquire the broadcasting information from a specific subframe of the DRX cycle indicated by the BI information.

The second UE (UE2) may awake in the $(n-1)^{th}$ paging occasion, blind-decode a PDCCH, and decode a PICH using PI-RNTI. The second UE may perform the operation similar to that of the first UE and acquire the broadcasting information from a specific subframe.

For example, the second UE may awake in the $(n-1)^{th}$ paging occasion, recognize that the broadcasting information transmitted to the second UE is present (using the BI field or the RB assignment field), awake in a next paging occasion (BI offset=1) indicated by the BIO field again, check a specific paging subframe, and acquire the broadcasting information.

Figure 5:
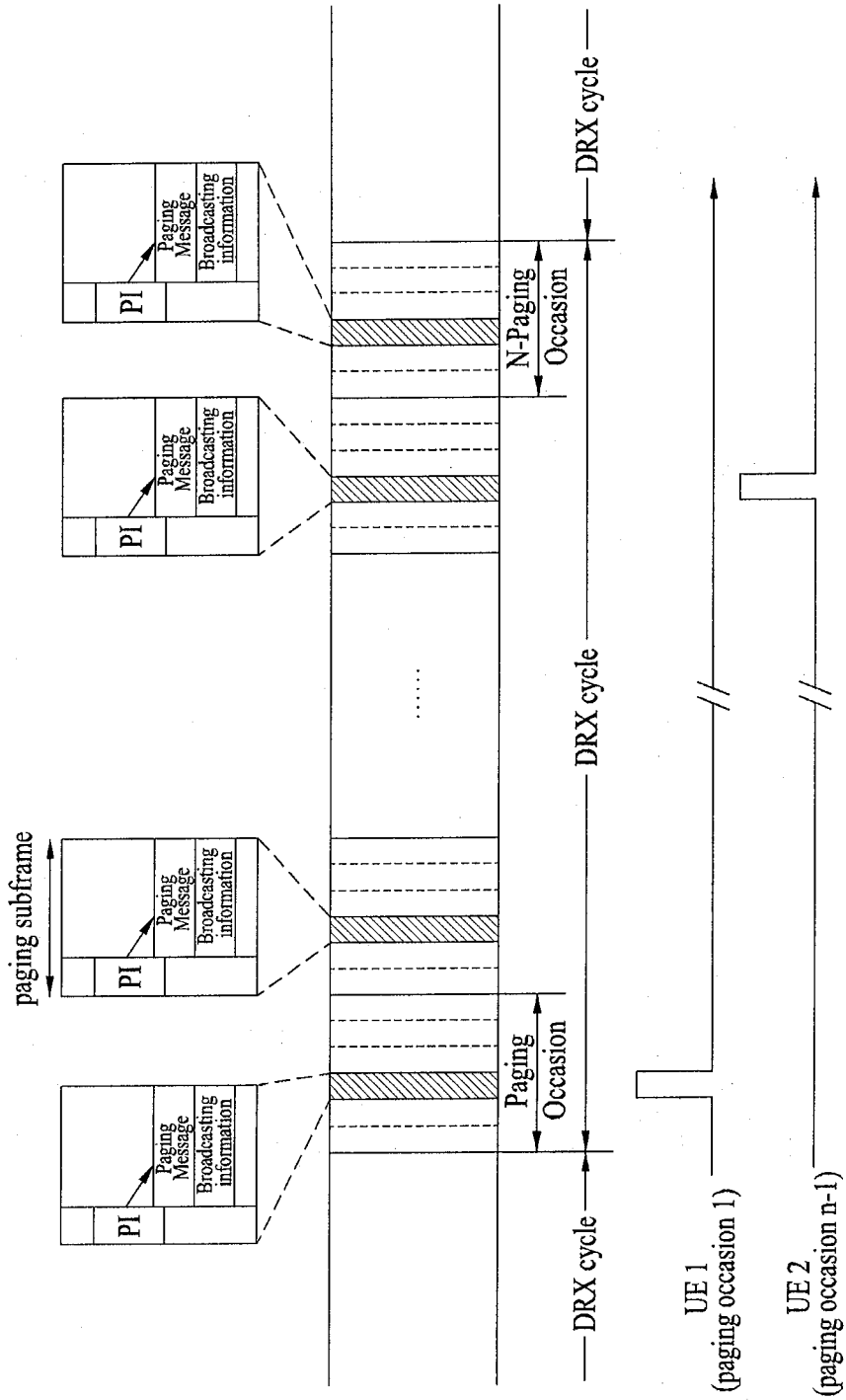
FIGS. 5 and 6 are views showing one of methods of transmitting broadcasting information to a UE in an idle mode or a sleep mode.
Figure 6:
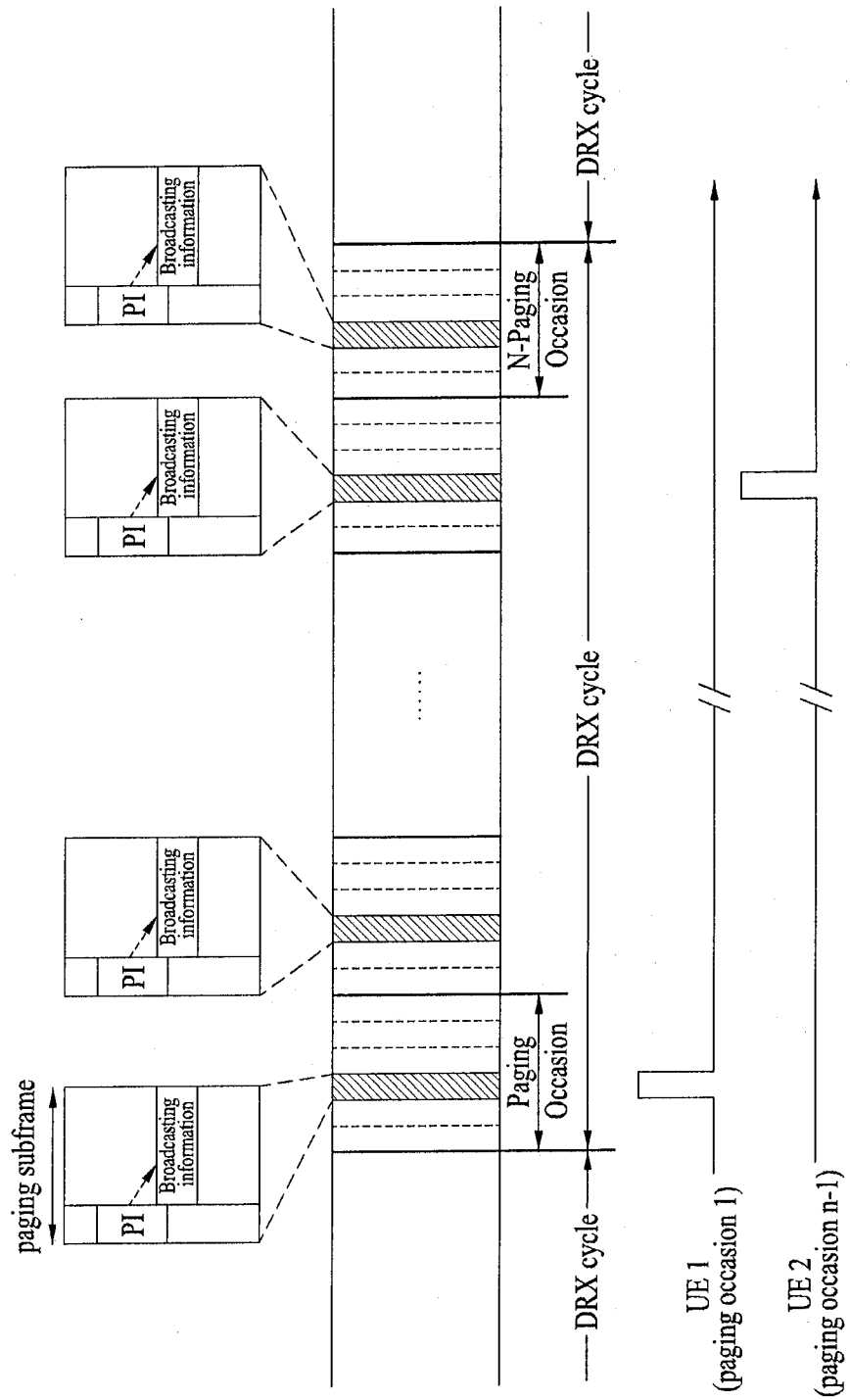

In FIG. 12, the BS may efficiently transmit the broadcasting information by transmitting the broadcasting information to the UEs in the paging DRX cycle once, unlike FIGS. 1, 5 and 6. In FIG. 12, each UE does not awake once within the paging DRX cycle and needs to awake one more time in a specific subframe indicated by the BI field.

Figure 13:
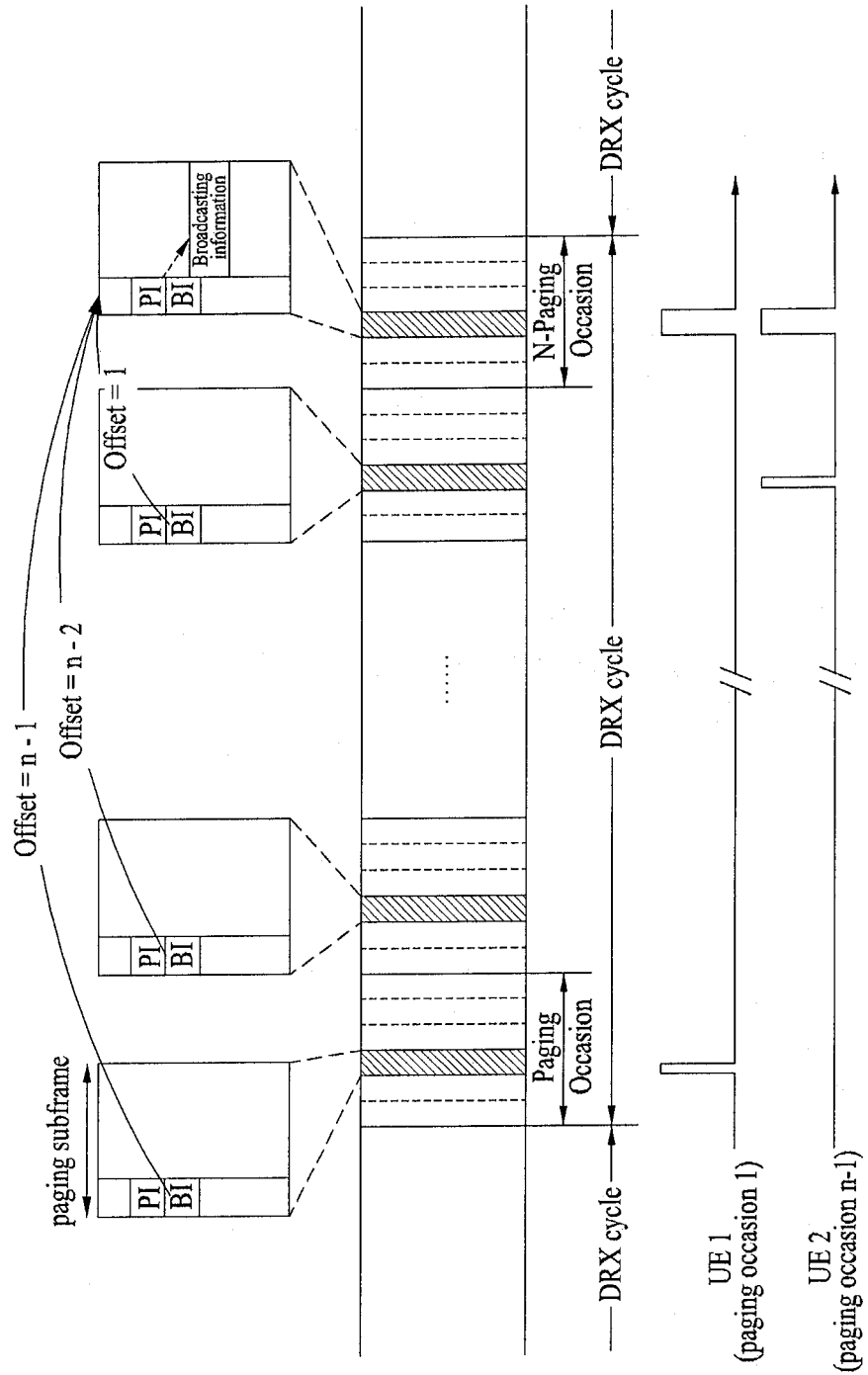
FIG. 13 is a view showing a case where a micro sleep method is applied to FIG. 12 according to another embodiment of the present invention.

FIG. 13 is a view showing a case where a micro sleep method is applied to FIG. 12 according to another embodiment of the present invention.

In FIG. 13, it is assumed that the micro sleep method is applied to each UE. For example, a first UE may decode a PDCCH using a PI-RNTI. A BI field indicates that broadcasting information is transmitted in another subframe of an $n^{th}$ paging occasion instead of a current paging subframe.

In this case, the first UE may awake for a while so as to decode only the PDCCH of the paging subframe, and immediately return to the idle mode or the sleep mode without decoding a PDSCH. Accordingly, it is possible to prevent power consumption of the UE.

Figure 14:
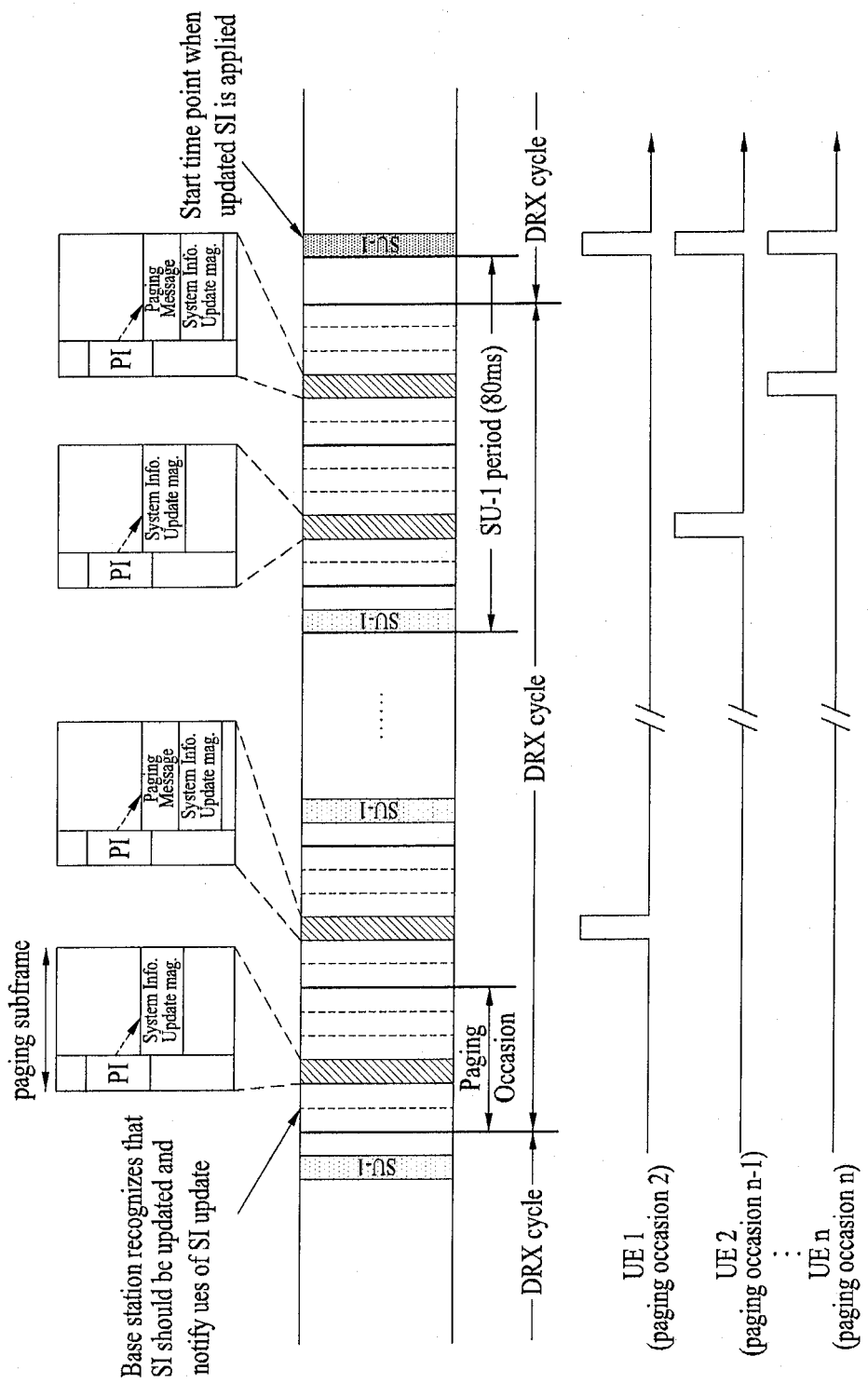
FIG. 14 is a view showing one of methods of transmitting SI.

FIG. 14 is a view showing one of methods transmitting SI.

Main functions performed in an RRC layer may include a broadcast service of SI. This service indicates methods of notifying the UEs of a variety of SI.

The SI includes a variety of information such as information for allowing a UE to be connected to a network and mobility support and measurement information of the UE in a connected mode.

The BS may transmit the SI to the UEs via a broadcast control channel (BCCH). The BS may use a broadcast channel (BCH) as a transmission channel of the SI.

Generally, the SI is transmitted by system units (SUs) and the SUs are transmitted in respective transmission cycles. An SU-1 is a system unit which is transmitted in a shortest transmission cycle and may be transmitted at an interval of 80 ms. The UE which acquires the SI does not change or update the SI until a system information modification message or a system information update (SIU) message for notifying that the SI is changed.

Generally, the SI is not frequently changed. For example, it is assumed that the SI is updated twice in a day in the 3GPP LTE system of the radio access systems. The SI may be transmitted by the SIU message.

In FIG. 14, it is assumed that the SU-1 is transmitted at an interval of 80 ms and a paging DRX cycle is 320 ms. Accordingly, the SU-1 may be transmitted several times (a maximum of four times) within one DRX cycle. All the UEs awake once within the paging DRX cycle and the SIU message is transmitted by a paging channel (PCH) used for paging. Accordingly, in order to allow all the UEs to receive the SIU message indicating that the SI is updated, a time corresponding to the paging DRX cycle (e.g., 320 ms) is necessary.

Accordingly, the BS may transmit the SIU message to the UEs in all the paging occasions of the DRX cycle from an instant of recognizing that the SI is updated. In addition, the SU-1 for transmitting the actually updated SI may be transmitted in a first paging occasion after all the UEs recognize that the SI is updated (that is, a time point elapsed by a DRX period after the transmission of the SIU is started). At this time, the UEs may awake again in order to acquire the updated SU-1 message.

Figure 15:
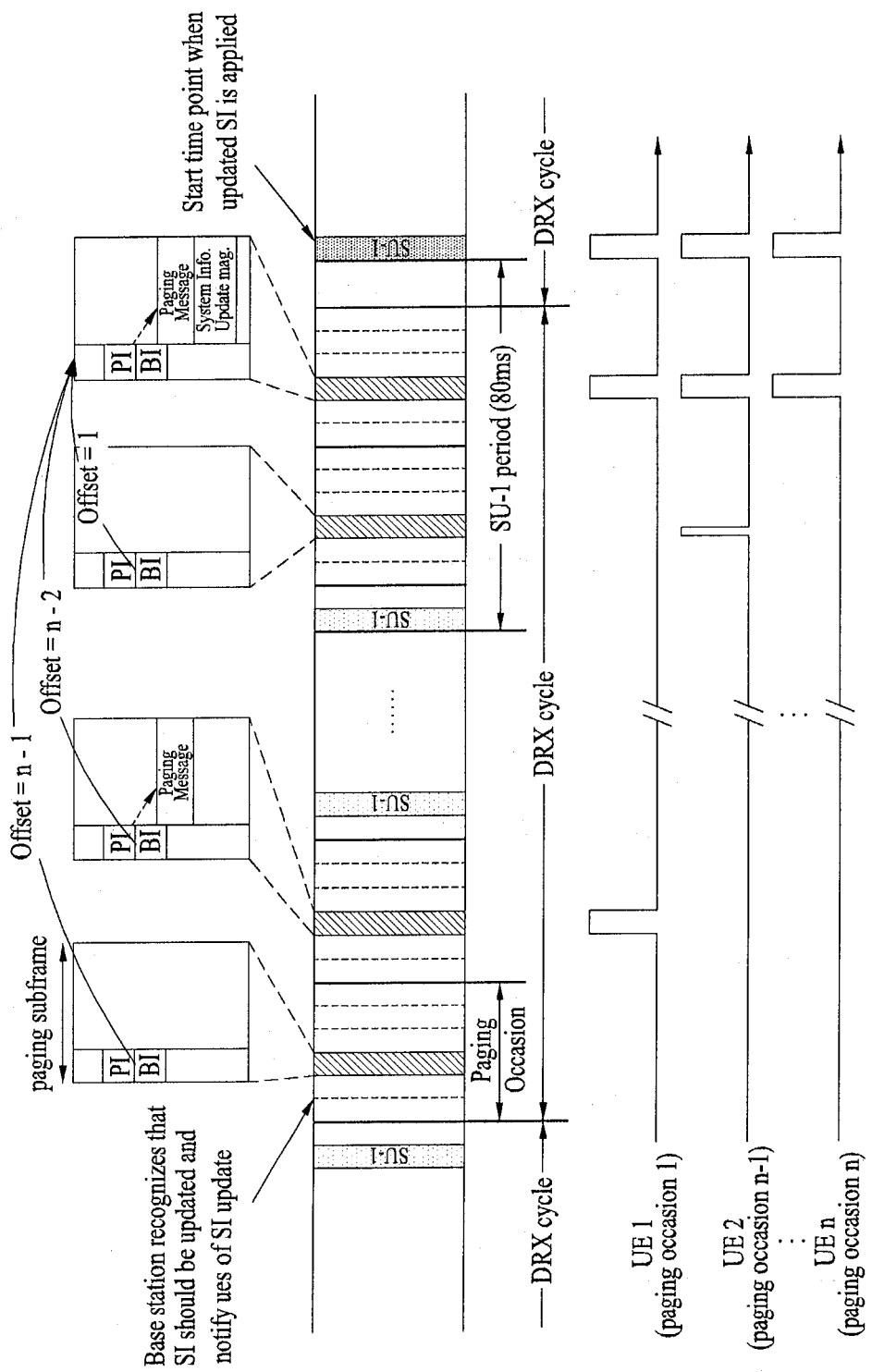
FIG. 15 is a view showing one of methods of transmitting SI to UEs according to another embodiment of the present invention.

FIG. 15 is a view showing one of methods of transmitting SI to UEs according to another embodiment of the present invention.

Referring to FIG. 15, the BS may recognize that the SI should be updated and notify the UEs in the idle mode or the sleep mode that the SI is updated. In FIG. 15, the BS may transmit location information of a specific subframe in which the SI is transmitted via the PICH, without transmitting the SI in every paging occasion of the paging DRX cycle.

That is, in FIG. 15, the BS notifies the UEs whether or not the SI has updated using the PICH in the PDCCH and notifies the UEs of the location of the specific subframe, via which the SI is transmitted, using an offset value. At this time, in order to notify whether or not the SI has updated and the transmission location of the SIU message, a PICH format structure of FIG. 9(b) may be used.

For example, the BI field indicates whether or not the SI has updated, and the BIO field indicates the location of the specific subframe, via which the SIU message is transmitted, using the offset value.

In FIG. 15, it is assumed that, in order to receive a paging message, a first UE (UE1) selects a second paging occasion, a second UE selects an $(n-1)^{th}$ paging occasion, and an $n^{th}$ UE selects an $n^{th}$ paging occasion as a paging period. The UEs may apply the micro sleep method described with reference to FIG. 13.

The first UE (UE1) may awake in a second paging occasion of the DRX cycle, decode a PDCCH, search for a PICH, and check whether or not the SI has updated the location of a specific subframe via which the SIU message is transmitted, using the BI field of the PICH. Accordingly, the first UE may receive the SIU message using the specific subframe indicated by the BI field and apply the updated SI from a next DRX cycle.

The second UE (UE2) may awake in an $(n-1)^{th}$ paging occasion, decode the PDCCH, and search for the PICH. At this time, the BI field indicates that the SIU message is is transmitted via a specific subframe. Accordingly, the second UE directly enters the idle mode or the sleep mode without decoding the PDSCH. In addition, the second UE may awake in a specific subframe indicated by the BI field again, decode the PDCCH and the PDSCH, and receive the SIU message.

The $n^{th}$ UE (UEn) may awake in an $n^{th}$ paging occasion, decode the PDCCH, and search for the PICH. At this time, the $n^{th}$ UE may receive the paging message using the PDSCH indicated by the PI field in the PICH and receive the SIU message via the PDSCH indicated by the BI field.

The first to $n^{th}$ UEs may apply the updated SI from the paging DRX cycle indicated by the SIU message.

Figure 16:
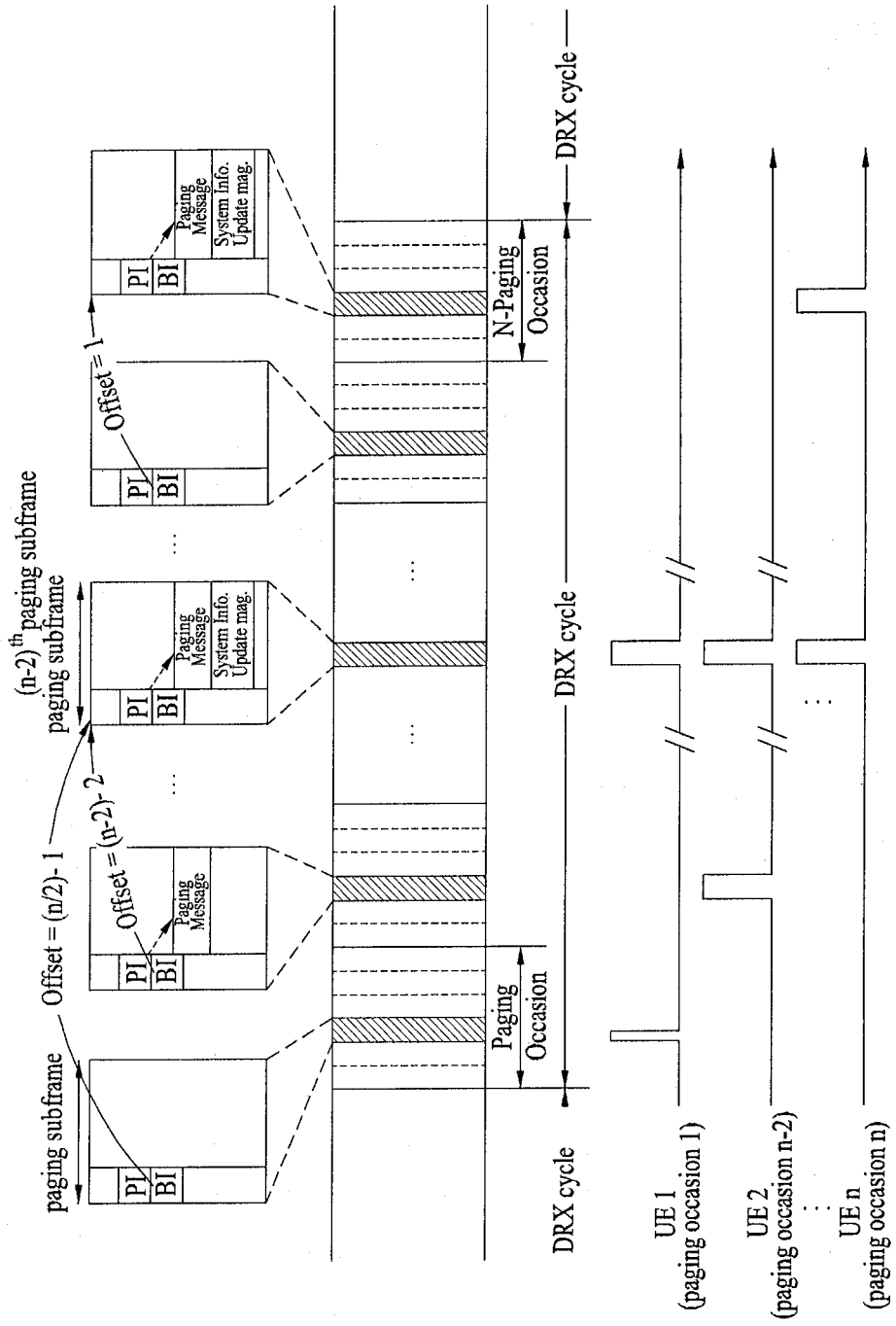
FIG. 16 is a view showing another method transmitting SI to UEs according to another embodiment of the present invention.

FIG. 16 is a view showing another method of transmitting SI to UEs according to another embodiment of the present invention.

In FIG. 16, the BS may transmit SI (or broadcasting information) to UEs at least twice in a predetermined period within a paging DRX cycle. For example, in another embodiment of the present invention, the BS may transmit the SIU message twice during one DRX cycle.

Referring to FIG. 16, the BS may broadcast the SIU message (or the broadcasting information) in a period of n/2 within the DRX cycle. That is, the BS may transmit the SIU message via an $n/2^{th}$ paging subframe as well as an $n^{th}$ (last) paging subframe. Accordingly, the UEs belonging to the n/2 previous paging occasion may acquire the SIU message (or the broadcasting information) via the $n/2^{th}$ paging subframe.

As shown in FIG. 16, the increase/decrease of the number of times of transmission of the broadcasting information may be efficiently used when the number n of paging occasions is too large to be represented in the BIO field if the size of the BIO field is fixed.

Figure 17:
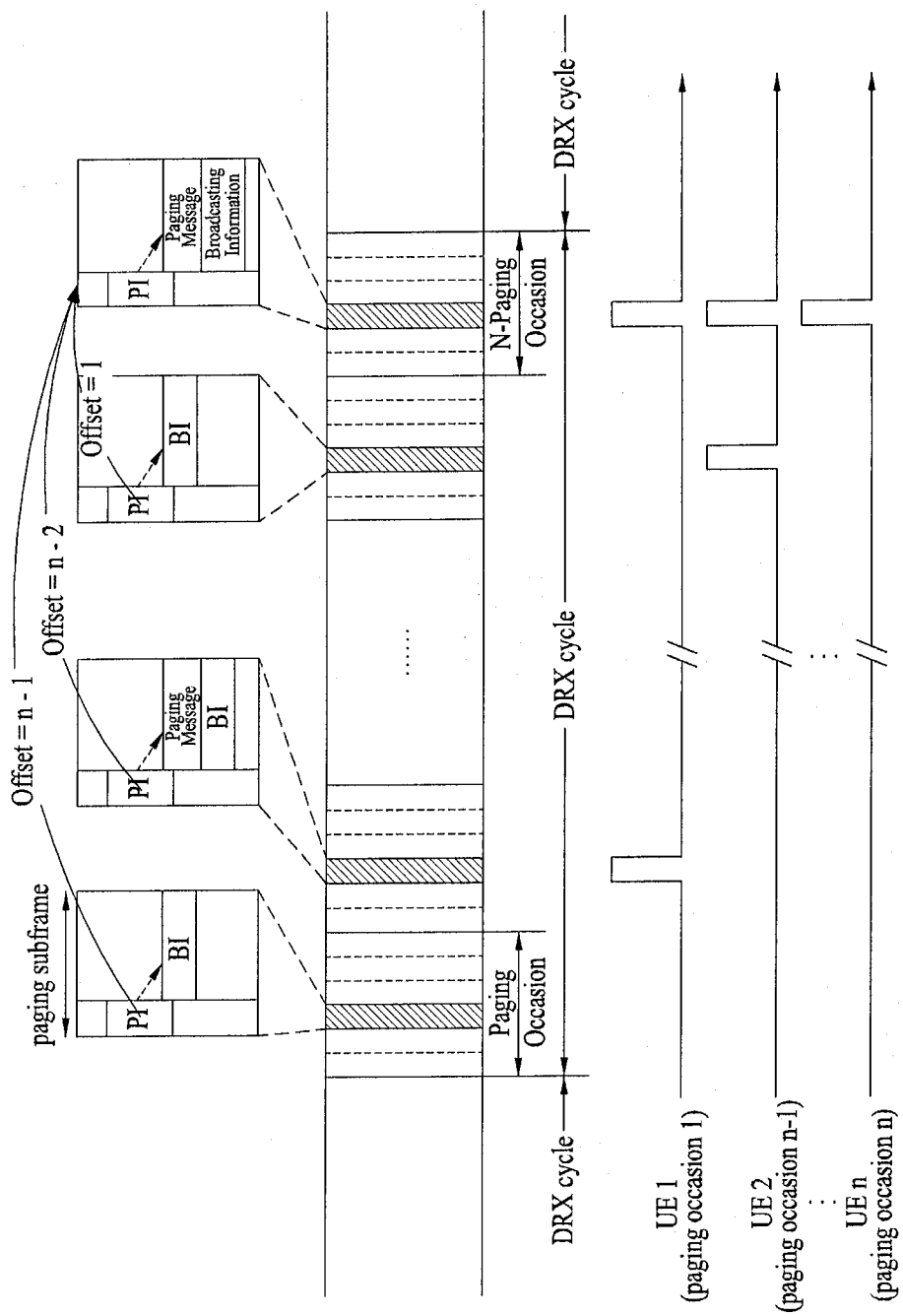
FIG. 17 is a view showing a method of transmitting a BI field to UEs via a PDSCH according to another embodiment of the present invention.

FIG. 17 is a view showing a method of transmitting a BI field to UEs via a PDSCH according to another embodiment of the present invention.

FIG. 17 shows a method which can be used when the PICH format of the PDCCH used generally is not changed. A first UE (UE1) may awake in a second paging occasion selected by the first UE, decode the PDCCH and search for the PICH. The PICH may indicate the location of the DL RB via which the paging message is transmitted and the location of the DL RB via which the BI field is transmitted.

The first UE may decode the BI field transmitted via the PDSCH and check information indicating whether or not the broadcasting information for the first UE is present and the location of a specific subframe via which the broadcasting information is transmitted.

The second UE may awake in an $(n-1)^{th}$ paging occasion, decode the PICH, check the transmission location of the BI field, decode the BI field in the PDSCH, and acquire the broadcasting information via a specific subframe.

The $n^{th}$ UE may awake in an $n^{th}$ paging occasion, decode the PICH, search for the BI field in the PDSCH, and acquire the broadcasting information in a specific subframe indicated by the BI field.

Figure 18:
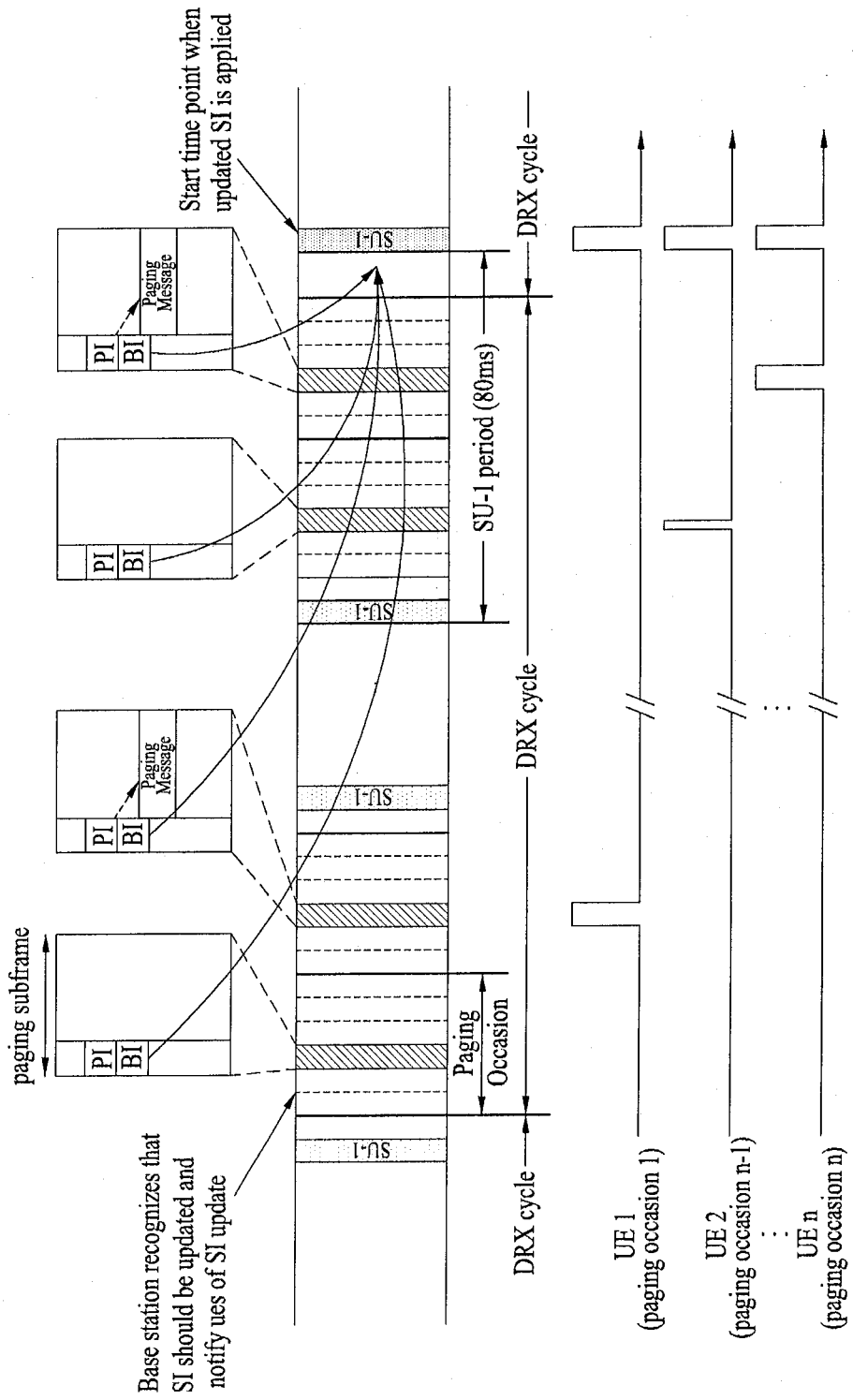
FIG. 18 is a view showing another method transmitting updated SI as another embodiment of the present invention.

FIG. 18 is a view showing another method of transmitting updated SI as another embodiment of the present invention.

FIG. 18 shows a method of, at a BS, notifying UEs of the location of a SU, via which updated SI is transmitted, using a BI field of a PICH, unlike FIGS. 15 and 16. That is, the BS may directly notify the UEs of the location of the SU including the updated SI without an SIU message. At this time, the BS may notify the UEs of the location of a start time point when the updated SI is applied using the BIO field. In addition, the BS may transmit the BI field including the location of the start time point when the updated SI is applied in a bit map form to the UEs.

Figure 19:
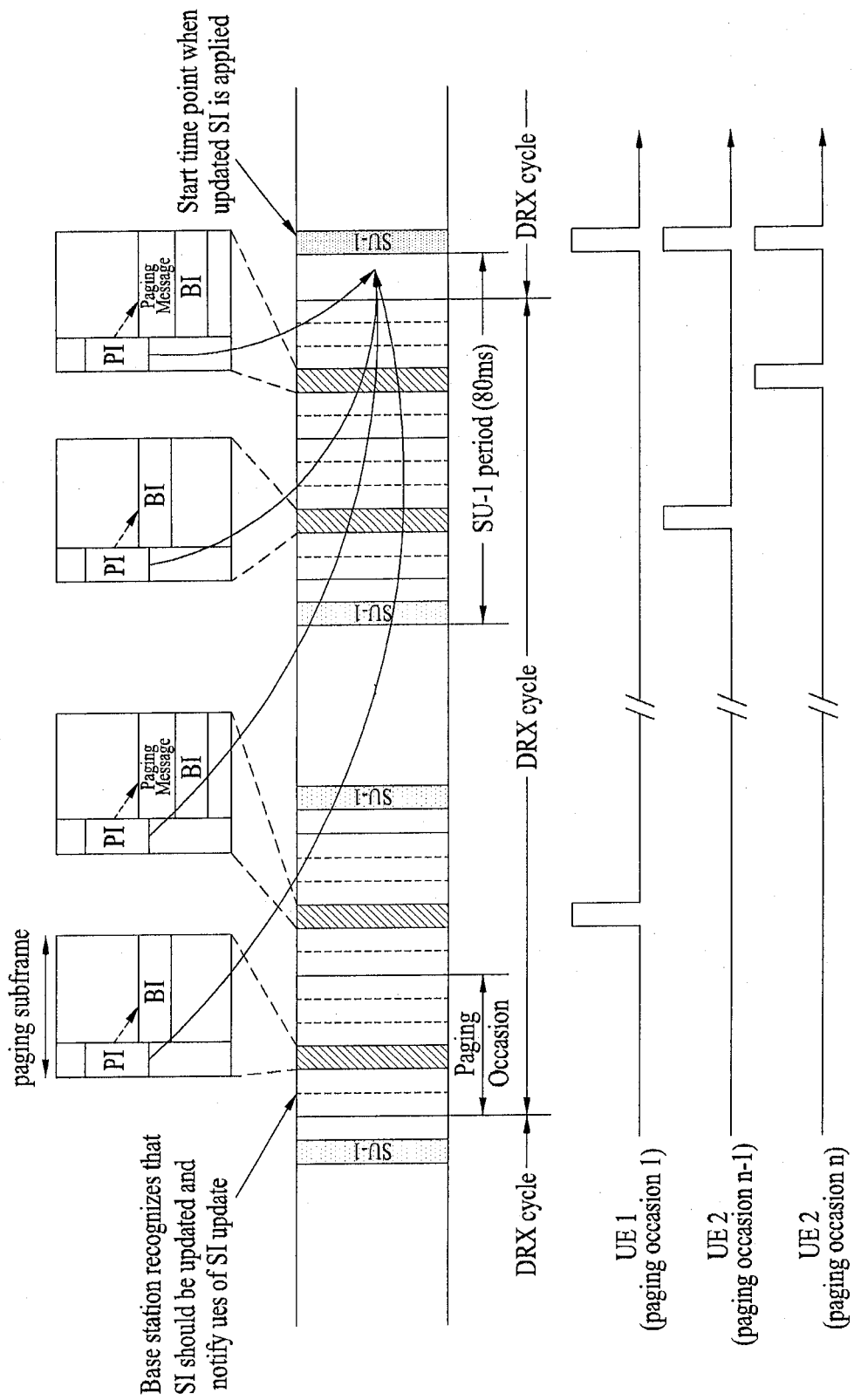
FIG. 19 is a view showing another method of transmitting updated SI according to another embodiment of the present invention.

FIG. 19 is a view showing another method of transmitting updated SI as another embodiment of the present invention.

FIG. 19 shows an embodiment obtained by applying the method of FIG. 17 to the method of FIG. 18. That is, the BS may notify the UEs of the transmission location of a BI field via a PICH. At this time, the BI field may be transmitted to the UEs via the PDSCH instead of the PDCCH. In addition, the BI field may indicate the transmission location of an SU including an actually updated SI instead of the SIU message indicating the transmission location of the updated SI. The operation principles of the UEs are similar to those described in FIGS. 17 and 18.

Hereinafter, the BI field and the BIO field which may be used in the embodiments of the present invention will be described.

<BI Field of PICH>

Hereinafter, the embodiments of a BI field which may be used in the embodiments of the present invention will be described. In the following description, the term "a corresponding subframe" indicates a specific paging subframe for decoding a PICH in a paging occasion negotiating with the BS when each UE enters the idle mode or the sleep mode.

As an example of a BI field, a BS may represent the effect of the BIO field using one bit. For example, if the BI field is set to "1", it is indicated that the BIO field is valid, and, if the BI field is set to "0", it is indicated that the BIO field is invalid in a next field. In addition, the BI field is a 1-bit field indicating that the broadcasting information directed to the UE is present if the BI field is set to "1" and indicating that the broadcasting information directed to the UE is not present if the BI field is set to "0". At this time, the BS may notify the UEs whether or not a paging message is present using the values of a RB assignment field and a payload size field.

As another example of the BI field, the existence/nonexistence of a paging message and the effect of the BIO value may be represented by two bits. At this time, a first bit indicates whether or not a paging message has transmitted via a corresponding subframe and a second bit indicates the effect of the BIO value of a next field.

For example, if the BI field is set to "11", it is indicated that the paging message is present in the corresponding subframe and the BI offset value of the next field is valid. If the BI field is set to "10", it is indicated that the paging message is present in the corresponding subframe but the BI offset value of the next field is invalid. If the BI field is set to "01", it is indicated that the paging message is not present in the corresponding subframe but the BI offset value of the next field is valid. If the BI field is set to "00", it is indicated that the PICH transmitted by the PI-RNTI is not present.

As another example of the BI field, the BS may indicate whether or not a paging message has transmitted, whether or not broadcasting information has transmitted and whether or not a BIO field is valid using three bits. For example, a first bit of the BI field indicates whether or not the paging message is present in a corresponding subframe, a second bit thereof indicates whether or not broadcasting information has transmitted via the corresponding subframe, and a third bit thereof indicates whether a corresponding BIO field is valid.

For example, if the BI field is set to "101", it is indicated that the paging message is present in the corresponding subframe, the broadcasting information is not transmitted, and the value of the BI offset field is valid. If the BI field is set to "100", it is indicated that the paging message is present in the corresponding subframe, the broadcasting information is not transmitted, and the value of the BI offset field is invalid. If the BI field is set to "11x", it is indicated that the paging message is present in the corresponding subframe and the broadcasting information is transmitted. At this time, since the broadcasting information is transmitted via the corresponding subframe, the BIO value may be any value (don't-care).

If the BI field is set to "01x", it is indicated that the paging message is not present in the corresponding subframe and the broadcasting information is transmitted via the corresponding subframe. At this time, since the broadcasting information is transmitted via the corresponding subframe, the BIO value of the next field may be any value (don't-care).

If the BI field is set to "001", it is indicated that the paging message is not present in the corresponding subframe, the broadcasting information is not transmitted, and the value of the BIO field is valid. Accordingly, the UE acquire the broadcasting information (or the SI) via the specific subframe indicated by the BIO value.

If the BI field is set to "000", it is indicated that the PICH transmitted by the PI-RNTI is not present. Since the updated broadcasting information or SI is not present, the UE may continuously maintain the idle mode or the sleep mode.

If the BI field is configured by at least one bit, the meaning of each bit may be changed according to channel environments.

<BIO Field of PICH>

Hereinafter, the embodiments of the BIO field which may be used in the embodiments of the present invention will be described.

In the embodiments of the present invention, the accurate bit size of the BI offset field is not defined. The size of the BI offset field may be decided according to the number of unnecessary bits by the decision of the size of the PICH format (see FIG. 9). This value is preferably a value indicating a paging occasion, in which the broadcasting information is transmitted, in the unit of subframes. That is, the BI offset value (j bits) may vary within a range of x+y+z according to the user's requirements or the channel environments.

In the embodiments of the present invention, it is assumed that the location of the subframe via which the BI field is transmitted is always fixed within the paging occasion and the BS notifies the UEs of the value of the BI offset field in the unit of paging occasions. If such an assumption is not allowed, the location of the subframe via which the broadcasting information has transmitted may be notified in the unit of subframes instead of paging occasions.

If the value of the BIO field is decided in the unit of subframes, the size of the BIO field is larger than that of the BI offset field which is set in the unit of paging occasions. If the BIO value is indicated in the unit of subframes and the size of the BIO value is small, the method of FIG. 16 may be used.

<The Case Where a DRX Specified by a UE is Used as a Paging DRX Cycle>

The embodiments of the present invention are applicable to the case where a DRX specified by an UE is used as well as the case where a DRX specified by a cell is used as a paging DRX cycle. For example, the broadcasting information may be set to be transmitted once within the subframe selected by a UE which lastly awakes among the UEs in the idle mode or the sleep mode. Accordingly, the BS may notify the UEs of the location of the subframe, via which the broadcasting information for all other UEs which awake in another subframe is transmitted, using the PICH or the PCH.

<Paging MIB Updating Method>

Other embodiments of the present invention relate to a method of notifying UEs whether or not SI (more particularly, MIB) transmitted via a PBCH has changed or updated. In particular, another embodiment of the present invention relates to a method of notifying the UEs whether or not the SI in a cell has updated using paging for the UEs in the idle mode or the sleep mode.

Figure 20:
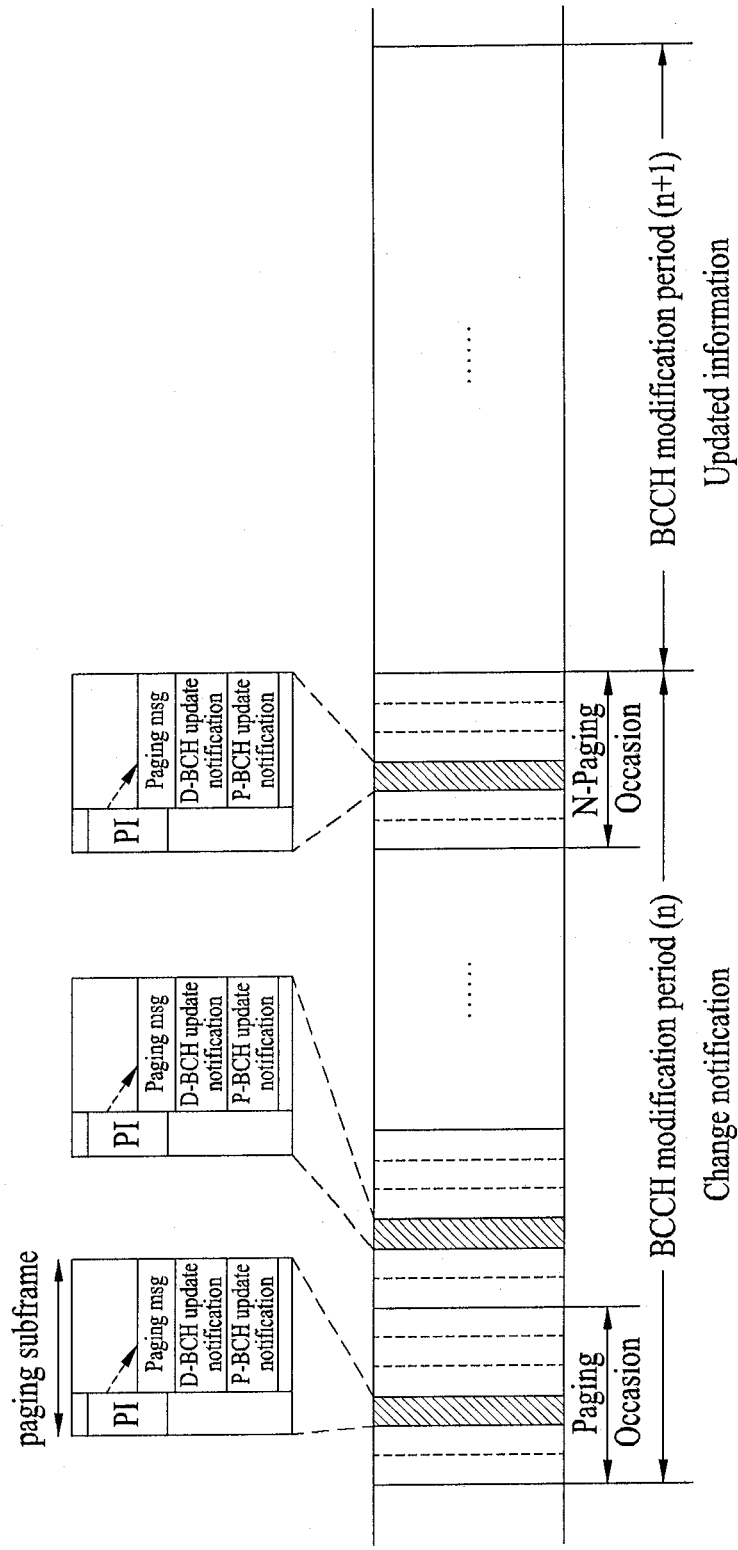
FIG. 20 is a view showing a method of notifying whether or not SI has updated via a paging channel (PCH) according to another embodiment of the present invention.

FIG. 20 is a view showing a method of notifying whether or not SI has updated via a PCH according to another embodiment of the present invention.

The UE in the idle mode or the sleep mode selects a paging occasion in the unit of subframes within the paging DRX cycle in order to receive a paging message directed to the UE, awakes in every paging occasion and checks the PICH until the paging message is transmitted. If the UE in the idle mode or the sleep mode receives the SI, the UE does not receive the SI until a message indicating that the SI is updated is received, awakes in a corresponding paging occasion, receives the PICH and the PCH, and checks only whether or not the paging message has transmitted.

At this time, the BS may transmit MIB update information to the UE via the PCH. That is, in another embodiment of the present invention, the BS may notify the UEs whether or not the SI transmitted via the PBCH has updated as well as whether or not the SI transmitted via the DBCH has updated using the PCH.

For example, the BS may transmit the paging message transmitted via the paging channel, including PBCH update notification information and DBCH update notification information, to the UEs.

Figure 21:
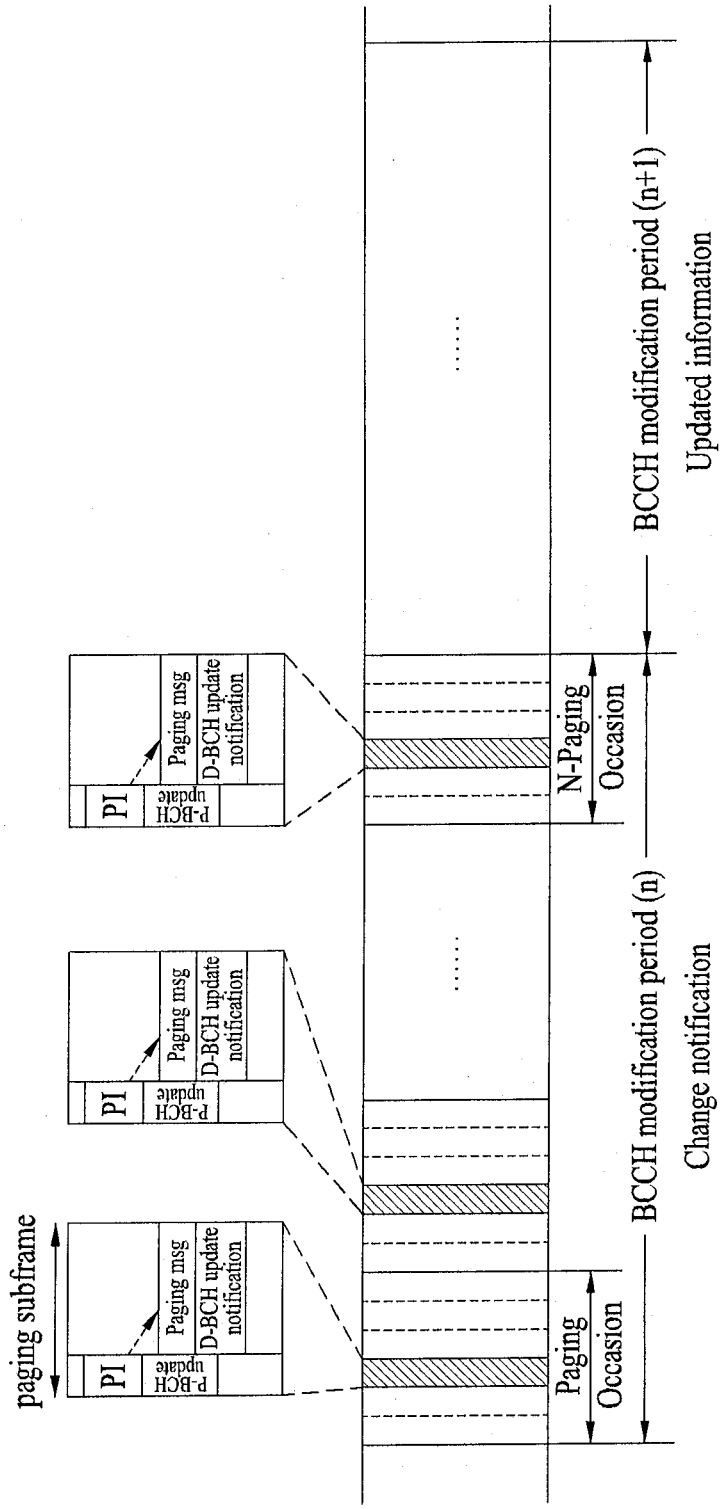
FIG. 21 is a view showing a method of notifying whether or not SI has updated via a paging indicator channel (PICH) according to another embodiment of the present invention.

FIG. 21 is a view showing a method of notifying whether or not SI has updated via a PICH according to another embodiment of the present invention.

The BS notifies the UEs whether or not the SI (e.g., SIBs) transmitted via the DBCH has updated using the PCH and notifies the UEs whether or not the SI (e.g., MIB) transmitted via the PBCH has updated using the PICH.

If the PICH is coded, the BS may XOR-operate a PI-RNTI and a CRC so as to generate the PICH which is distinguished from a DL scheduling grant message generated by the XOR-operation between a C-RANI and the CRC. The UE may blind-decode the PDCCH by the PI-RNTI in a paging occasion selected by the UE and search for the PICH.

The BS may transmit the PICH to the UEs via the PDCCH in the BCCH modification period. The BS may include a PBCH update field in the PICH and notify the UEs whether or not the MIB transmitted via the PBCH has updated. The BS may include a PBCH update field having a size of 1 bit or more in the PICH.

FIG. 22 is a view showing another example of a PICH format which may be used in the embodiments of the present invention.

The PICH may include a downlink resource block (DL RB) assignment information field for transmitting DL data, a DL MIMO information field, a modulation scheme field indicating a modulation scheme, a payload size field indicating the size of a payload to which actual data is assigned, a HARQ information field for reliable transmission of data, and a CRC field for error detection of the PICH.

The BS may add a new field indicating whether or not SI transmitted via the PBCH has updated. That is, the BS may add a PBCH update notification field of one bit or more to the PICH.

As another embodiment, the PBCH update notification field may be used instead of the x+y+z bits as shown in FIG. 9(b). For example, the BS may omit the DL MIMO information field, the modulation scheme field and the HARQ information field. In addition, the BS may add the PBCH update notification field to the PICH, and may transmit the PICH to the UEs.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The embodiments of the present invention are applicable to various radio access systems. Examples of the various radio access systems may include the 3$^{rd}$ generation partnership project (3GPP) system, the 3GPP2 system and/or the Institute of Electrical and Electronic Engineers 802 (IEEE802.xx) system. The embodiments of the present invention are applicable to all technical fields using the various radio access systems as well as the various radio access systems.

The invention claimed is:

1. A method of transmitting system information to a user equipment (UE) in an idle mode, the method comprising:
receiving information related to the idle mode, the information related to the idle mode including a paging discontinuous reception (DRX) cycle field indicating a time interval for monitoring a paging occasion of the UE in the idle mode and a paging occasion field indicating a paging occasion monitored in order to allow the UE to receive a paging message;
decoding a control channel assigned to a first paging subframe according to the information related to the idle mode, the control channel including a broadcasting information indicator (BI) field and a broadcasting information occasion offset (BIO) field, wherein the BI field indicates whether or not the system information has updated, and wherein the BIO field indicates a transmission location of a system information update message; and
receiving the system information update message including updated system information via a second paging subframe indicated by the BIO field regardless of the information related to the idle mode when the BI field indicates that the system information is updated.

2. The method according to claim 1, wherein:
the control channel is a paging indication channel (PICH), and
the PICH is masked using a paging indicator-radio network temporary identity (PI-RNTI).

3. The method according to claim 1, wherein the BIO field is assigned in the unit of paging occasions.

4. The method according to claim 1, wherein, in the decoding of the control channel, if the BI field indicates that the system information has been updated, the UE immediately enters the idle mode again without decoding a downlink shared channel of the second paging subframe.

5. The method according to claim 1, wherein the BIO field further indicates a time point when the updated system information is applied.

6. The method according to claim 1, wherein the BIO field indicates that the broadcasting information is periodically transmitted within the paging DRX cycle.

7. A method of efficiently receiving system information at a user equipment (UE) in an idle mode, the method comprising:
receiving information related to the idle mode, the information related to the idle mode including a discontinuous reception (DRX) cycle and a paging occasion;
decoding a physical downlink control channel (PDCCH) assigned to a first paging subframe according to the information related to the idle mode, the PDCCH indicating a location of the PDSCH;
decoding a physical downlink shared channel (PDSCH) indicated by the PDCCH in the first paging subframe, the PDSCH comprising a broadcasting information indicator (BI) filed and a broadcasting information occasion offset (BIO) field, wherein the BI field indicates whether or not the system information has updated and the BIO field indicates a transmission location of a system information update message including updated system information; and
receiving the system information via a second paging subframe indicated by BIO regardless of the information related to the idle mode, when the BI field indicates the system information has updated.

8. The method according to claim 7, wherein:
the BIO field further indicates a time point when the updated system information is applied.

9. A method of transmitting system information to a user equipment (UE), the method comprising:
transmitting information related to the idle mode, the information related to the idle mode including a paging discontinuous reception (DRX) cycle field indicating a time interval for monitoring a paging occasion of the UE in the idle mode and a paging occasion field indicating a paging occasion monitored in order to allow the UE to receive a paging message;

transmitting a control channel to the UE via a first paging subframe according to the information related to the idle mode, the control channel including a broadcasting information indicator (BI) field and a broadcasting information occasion offset (BIO) field, wherein the BI field indicates whether or not the system information has updated, and wherein the BIO field indicates a transmission location of a system information update message; and broadcasting the system information via a second paging subframe indicated by BIO field regardless of the information related to the idle mode, when the BI field indicates that the system information is updated.

* * * * *